(12) United States Patent
Aiso et al.

(10) Patent No.: US 9,492,925 B2
(45) Date of Patent: Nov. 15, 2016

(54) ROBOT CONTROLLER, ROBOT SYSTEM, ROBOT, ROBOT CONTROL METHOD, AND PROGRAM

(71) Applicant: Seiko Epson Corporation, Tokyo (JP)

(72) Inventors: Seiji Aiso, Shiojiri (JP); Hiroshi Hasegawa, Chino (JP); Mitsuhiro Inazumi, Shiojiri (JP); Nobuhiro Karito, Kiso (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/510,591

(22) Filed: Oct. 9, 2014

(65) Prior Publication Data

US 2015/0105907 A1   Apr. 16, 2015

(30) Foreign Application Priority Data

Oct. 10, 2013   (JP) .................................. 2013-212919
Oct. 10, 2013   (JP) .................................. 2013-212940

(51) Int. Cl.
*G05B 15/00* (2006.01)
*B25J 9/16* (2006.01)

(52) U.S. Cl.
CPC ............. *B25J 9/1697* (2013.01); *B25J 9/1633* (2013.01); *G05B 2219/39325* (2013.01); *G05B 2219/39391* (2013.01); *G05B 2219/40307* (2013.01); *Y10S 901/09* (2013.01); *Y10S 901/47* (2013.01)

(58) Field of Classification Search
CPC ................ B25J 9/1697; B25J 9/1633; G05B 2219/39325; G05B 2219/40307; G05B 2219/39391; Y10S 901/09; Y10S 901/47
USPC ........................................................ 700/259
See application file for complete search history.

(56) References Cited

U.S. PATENT DOCUMENTS

| | | | |
|---|---|---|---|
| 5,056,038 A | 10/1991 | Kuno et al. | |
| 6,317,653 B1 | 11/2001 | Kamiya | |
| 8,600,552 B2 | 12/2013 | Nakajima et al. | |
| 2010/0114371 A1* | 5/2010 | Tsusaka | B25J 9/0003 700/250 |
| 2010/0286826 A1* | 11/2010 | Tsusaka | B25J 9/1633 700/254 |
| 2011/0106311 A1* | 5/2011 | Nakajima | B25J 9/1697 700/253 |
| 2012/0253516 A1 | 10/2012 | Iida | |
| 2012/0294509 A1 | 11/2012 | Matsumoto | |
| 2013/0310977 A1* | 11/2013 | Tsusaka | B25J 9/1656 700/257 |
| 2014/0107840 A1 | 4/2014 | Nakajima et al. | |

FOREIGN PATENT DOCUMENTS

| | | | |
|---|---|---|---|
| JP | 2000-301479 A | 10/2000 | |
| JP | 2011-093055 A | 5/2011 | |
| JP | 2012-206206 A | 10/2012 | |
| JP | 2014-054692 A | 3/2014 | |

OTHER PUBLICATIONS

Hosoda et al (Adaptive Hybrid Visual Servoing/Force Control in Unknown Environment, IEEE 1996 0-7803-3213-X).*
Hosoda K et al: "Adaptive Hybrid Visual Servoing/Force Control in Unknown Environment", Proceedings of the 1996 IEEE/RSJ International Conference on Robots and Systems (IROS). Robotic Intelligence Interacting with Synamic Worlds. Osaka, Nov. 4-8, 1996, pp. 1097-1103, XP000774012, ISBN: 978-0-7803-3214-0.
Extended European Search Report for Application No. EP 14 18 8281 dated Oct. 6, 2015 (10 pages).

* cited by examiner

*Primary Examiner* — Ian Jen
(74) *Attorney, Agent, or Firm* — Harness, Dickey & Pierce, P.L.C.

(57) ABSTRACT

A robot includes a control unit that controls a movable unit of the robot to move an endpoint of the movable unit closer to a target position, and an image acquisition unit that acquires a target image as an image containing the end point when the end point is in the target position, and a current image as an image containing the end point when the end point is in a current position. The control unit controls movement of the movable unit based on the current image and the target image and output from a force detection unit that detects a force acting on the movable unit.

13 Claims, 26 Drawing Sheets

ROBOT CONTROLLER, ROBOT SYSTEM, ROBOT, ROBOT CONTROL METHOD, AND PROGRAM

The entire disclosures of Japanese Patent Application Nos. 2013-212919, filed Oct. 10, 2013 and 2013-212940, filed Oct. 10, 2013 are expressly incorporated by reference herein.

BACKGROUND

1. Technical Field

The present invention relates to a robot controller, a robot system, a robot, a robot control method, and a program.

2. Related Art

Patent Document 1 (JP-A-2000-301479) discloses a robot controller that obtains a target position in impedance control of a robot by obtaining a tentative target position in which, when a pressing reaction force acting on a robot distal end exceeds a predetermined magnitude, the pressing reaction force takes a set limit value, and adding an amount of position correction in response to the pressing reaction force to the tentative target position.

However, in the technology of Patent Document 1, when a current position of an object such as a work differs more than assumed, it is difficult to move the object to the target position. For example, in a fitting operation of fitting a work in a hole, the work is pressed against the edge of the hole or the like by impedance control, and thereby, the operation may be completed. However, when the position of the work is far different from the hole, it is difficult to correct the current position and complete the operation because it is impossible to detect the difference of the work from the hole (direction, distance, or the like) in the impedance control. For completion of the operation of the robot, an operation by a user such that the user corrects and teaches the trajectory of the robot again is generated.

SUMMARY

An advantage of some aspects of the invention is to efficiently move an object to a target position even when the object differs in position in operation by a robot.

A first aspect of the invention is directed to a robot controller including an image acquisition unit that acquires a target image as an image containing an endpoint of a movable unit of a robot when the end point is in a target position, and a current image as an image containing the end point when the end point is in a current position, a first control unit that generates a command value for moving the end point from the current position to the target position based on the current image and the target image, a second control unit that generates a command value for moving the end point based on output from a force detection unit that detects a force acting on the movable unit, and a third control unit that moves the movable unit using the command value generated by the first control unit and the command value generated by the second control unit. Thereby, even when an object differs in position, the position of the movable unit may be corrected with higher accuracy by the command value of the first control unit. Further, even when a trajectory of the movable unit based on the command value of the first control unit is inefficient, the trajectory may be corrected to a trajectory with higher efficiency by the command value of the second control unit.

A second aspect of the invention is directed to a robot controller including a control unit that controls a movable unit of a robot to move an end point of the movable unit closer to a target position, and an image acquisition unit that acquires a target image as an image containing the end point when the end point is in the target position, and a current image as an image containing the end point when the end point is in a current position, wherein the control unit controls movement of the movable unit based on the current image and the target image and output from a force detection unit that detects a force acting on the movable unit. Thereby, even when an object differs in position, the position of the movable unit may be corrected with higher accuracy by the control based on the images. Further, even when a trajectory of the movable unit by the control based on the images is inefficient, the trajectory may be corrected to a trajectory with higher efficiency by the control based on the force.

In the robot controller described above, the third control unit may move the movable unit using a command value obtained by summing the command value generated by the first control unit and the command value generated by the second control unit with respective predetermined weights. Thereby, the trajectory of the movable unit and accuracy of the operation may be adjusted to desired trajectory and accuracy of the operation.

In the robot controller described above, an input unit that accepts setting of the predetermined weights from a user may be provided. Thereby, the weights may be set such that a trajectory and accuracy of operation desired by the user are obtained.

In the robot controller described above, the third control unit may determine the predetermined weights based on a distance between the current position and the target position. Thereby, the weights are changed in response to the distance, and the control may be performed with higher accuracy. Further, the weights are continuously changed in response to the distance, and the control may be smoothly switched.

In the robot controller described above, the third control unit may determine the distance based on the images acquired by the image acquisition unit. Thereby, the distance may be determined based on the same image as the image used by the first control unit, and increase in load of image processing may be prevented.

In the robot controller described above, the third control unit may set the predetermined weight corresponding to the command value generated by the second control unit to be larger as the distance is smaller. In a position in which an effect by force control is effectively obtained like a position closer to the target position, an inefficient trajectory by the first control unit may be corrected and the movable unit may be moved more efficiently.

In the robot controller described above, the third control unit may set the predetermined weight corresponding to the command value generated by the second control unit to be zero when the distance is larger than a predetermined value. In a position in which an effect by force control is not effectively obtained like a position farther from the target position, the movable unit may be moved more efficiently by the first control unit.

A third aspect of the invention is directed to a robot including a movable unit, a force detection unit that detects a force acting on the movable unit, an image acquisition unit that acquires a target image as an image containing an end point of the movable unit when the end point is in a target position, and a current image as an image containing the end point when the end point is in a current position, a first control unit that generates a command value for moving the end point from the current position to the target position based on the current image and the target image, a second control unit that generates a command value for moving the end point based on output from the force detection unit, and a third control unit that moves the movable unit using the command value generated by the first control unit and the command value generated by the second control unit. Thereby, even when an object differs in position, the position of the movable unit may be corrected with higher accuracy by the command value of the first control unit. Further, even when a trajectory of the movable unit based on the command value of the first control unit is inefficient, the trajectory may be corrected to a trajectory with higher efficiency by the command value of the second control unit.

A fourth aspect of the invention is directed to a robot including a movable unit, a force detection unit that detects a force acting on the movable unit, a control unit that controls the movable unit to move an end point of the movable unit closer to a target position, and an image acquisition unit that acquires a target image as an image containing the end point when the end point is in the target position, and a current image as an image containing the end point when the end point is in a current position, wherein the control unit controls movement of the movable unit based on the current image and the target image and output from the force detection unit. Thereby, even when an object differs in position, the position of the movable unit may be corrected with higher accuracy by the control based on the images. Further, even when a trajectory of the movable unit by the control based on the images is inefficient, the trajectory may be corrected to a trajectory with higher efficiency by the control based on the force.

A fifth aspect of the invention is directed to a robot system including a robot having a movable unit, an image acquisition unit that acquires a target image as an image containing an end point of the movable unit when the end point is in a target position, and a current image as an image containing the end point when the end point is in a current position, a first control unit that generates a command value for moving the endpoint from the current position to the target position based on the current image and the target image, a second control unit that generates a command value for moving the end point based on output from a force detection unit that detects a force acting on the movable unit, and a third control unit that moves the movable unit using the command value generated by the first control unit and the command value generated by the second control unit. Thereby, even when an object differs in position, the position of the movable unit may be corrected with high accuracy by the command value of the first control unit. Further, even when a trajectory of the movable unit based on the command value of the first control unit is inefficient, the trajectory may be corrected to a trajectory with higher efficiency by the command value of the second control unit.

A sixth aspect of the invention is directed to a robot system including a robot having a movable unit, a control unit that controls the movable unit to move an end point of the movable unit closer to a target position, and an image acquisition unit that acquires a target image as an image containing the end point when the end point is in the target position, and a current image as an image containing the end point when the end point is in a current position, wherein the control unit controls movement of the movable unit based on the current image and the target image and output from a force detection unit that detects a force acting on the movable unit. Thereby, even when an object differs in position, the position of the movable unit may be corrected with higher accuracy by the control based on the images. Further, even when a trajectory of the movable unit by the control based on the images is inefficient, the trajectory may be corrected to a trajectory with higher efficiency by the control based on the force.

A seventh aspect of the invention is directed to a robot control method including an image acquisition step of acquiring a target image as an image containing an end point of a movable unit of a robot when the end point is in a target position, and a current image as an image containing the end point when the end point is in a current position, a first control step of generating a command value for moving the end point from the current position to the target position based on the current image and the target image, a second control step of generating a command value for moving the end point based on output from a force detection unit that detects a force acting on the movable unit, and a third control step of moving the movable unit using the command value generated at the first control step and the command value generated at the second control step. Thereby, even when an object differs in position, the position of the movable unit may be corrected with higher accuracy by the command value at the first control step. Further, even when a trajectory of the movable unit based on the command value at the first control step is inefficient, the trajectory may be corrected to a trajectory with higher efficiency by the command value at the second control step.

An eighth aspect of the invention is directed to a robot control method including a control step of controlling a movable unit of a robot to move an end point of the movable unit closer to a target position, and an image acquisition step of acquiring a target image as an image containing the end point when the end point is in the target position, and a current image as an image containing the end point when the end point is in a current position, wherein the control step controls movement of the movable unit based on the current image and the target image and output from a force detection unit that detects a force acting on the movable unit. Thereby, even when an object differs in position, the position of the movable unit may be corrected with higher accuracy by the control based on the images. Further, even when a trajectory of the movable unit by the control based on the images is inefficient, the trajectory may be corrected to a trajectory with higher efficiency by the control based on the force.

A ninth aspect of the invention is directed to a robot control method of parallel-controlling control of a movable unit of a robot based on an image containing an end point of the movable unit, and control of the movable unit based on output from a force detection unit that detects a force acting on the movable unit. Thereby, even when an object differs in position, the position of the movable unit may be corrected with higher accuracy by the control based on the image. Further, even when a trajectory of the movable unit by the control based on the image is inefficient, the trajectory may be corrected to a trajectory with higher efficiency by the control based on the force.

A tenth aspect of the invention is directed to a program of a robot controller allowing the robot controller to function as an image acquisition unit that acquires a target image as an image containing an end point of a movable unit of a robot when the end point is in a target position, and a current image as an image containing the end point when the end point is in a current position, a first control unit that generates a command value for moving the end point from the current position to the target position based on the current image and the target image, a second control unit that generates a command value for moving the end point based on output from a force detection unit that detects a force acting on the movable unit, and a third control unit that moves the movable unit using the command value generated by the first control unit and the command value generated by the second control unit. Thereby, even when an object differs in position, the position of the movable unit may be corrected with higher accuracy by the command value of the first control unit. Further, even when a trajectory of the movable unit based on the command value of the first control unit is inefficient, the trajectory may be corrected to a trajectory with higher efficiency by the command value of the second control unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

The embodiment will be explained with reference to the drawings.

Figure 1:
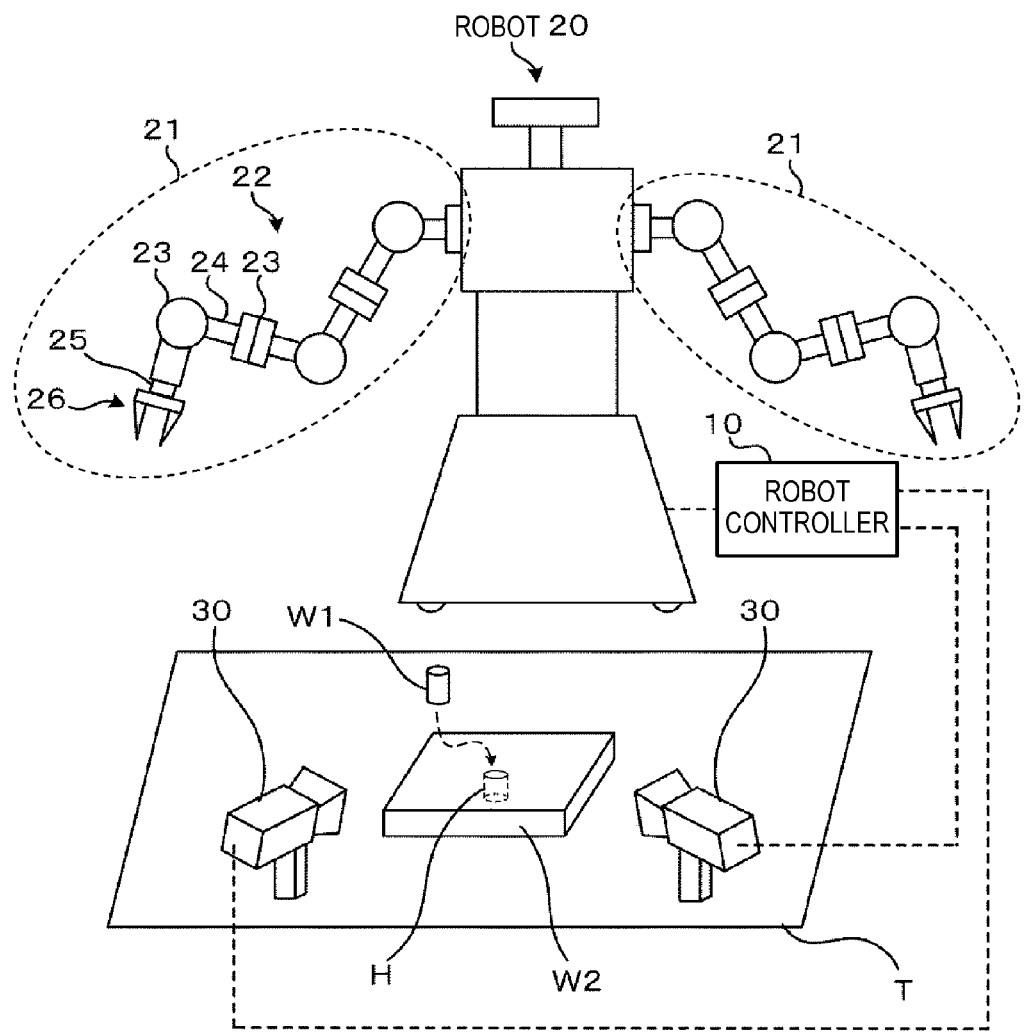
FIG. 1 shows an example of a schematic configuration of a robot system according to the first embodiment.

FIG. 1 shows an example of a schematic configuration of a robot system 1 according to the embodiment. As shown in FIG. 1, the robot system 1 includes a robot controller 10, a robot 20, and imaging devices 30. The robot controller 10 is communicably connected to the robot 20 and the imaging devices 30.

The robot controller 10 controls the entire robot 20. Further, the robot controller 10 controls imaging by the imaging devices 30.

The robot 20 moves according to a control signal from the robot controller 10 and performs an operation. The operation content is not particularly limited. For example, an operation of fitting a work W1 into a hole H of a work W2 on a working table T or the like is considered. The work may be called an object of operation.

The robot 20 has an arm 22 including one or more joints 23 and one or more links 24, a hand 26 provided on the distal end of the arm 22, and a force sensor 25 provided between the distal end of the arm 22 and the hand 26 (also referred to a wrist part).

The force sensor 25 detects a force and moment acting on the hand 26, for example. The output of the force sensor 25 is sent to the robot controller 10 and used for impedance control etc. of the robot 20 by the robot controller 10. As the force sensor 25, for example, a six-axis force sensor capable of simultaneously detecting six components of force components in translation three axial directions and moment components around rotation three axes may be used. Obviously, the number of axes of the force sensor 25 is not particularly limited, but may be three, for example. The force sensor 25 may be referred to as "force detection unit".

The hand 26 has a plurality of fingers, for example, and is capable of grasping an object W (W1, W2) at least with two fingers. The hand 26 may be detachable from the distal end of the arm 22. The hand 26 may be considered as a kind of end effector. The end effector is a member for grasping, lifting, hoisting, and suctioning an object, and processing a work. The end effector may take various forms including a hand, a hook, and a sucker. Further, a plurality of the end effectors may be provided for one arm.

A unit including the arm 22, the force sensor 25, and the hand 26 may be referred to as "movable unit" or "manipulator" (hereinafter, referred to as "movable unit"). In the example of FIG. 1, the robot 20 has two movable units 21. In the movable unit 21, e.g., actuators (not shown) are provided for operating the respective parts of the joints 23, the hand 26, etc. The actuator includes a servo motor, an encoder, etc. Encoder values output by the encoder are used for feedback control of the robot 20 by the robot controller 10 and a drive control unit 200 (see FIG. 2) of the robot 20, which will be described later, or the like.

The robot 20 drives the respective joints 23 with link to one another according to the control command provided from the robot controller 10, and thereby, may freely move a position of interest set on the distal end of the arm 22 or the like (hereinafter, referred to as "end point") within a predetermined movable range or direct the position in a free direction. Further, the object or the like may be grasped and released using the hand 26.

Note that the position of the end point is not limited to the distal end of the arm, but may be set to a distal end of the end effector.

The imaging device 30 images a work region of the robot 20 (e.g., a three-dimensional space as a range in which operations can be performed by the movable units 21 on the work table T), and generates image data. In the example of FIG. 1, two of the imaging devices 30 are provided on the work table T at different angles. As the imaging device 30, e.g., a visible light camera, an infrared camera, or the like may be employed. Images taken by the imaging device 30 are input to the robot controller 10.

Only the main configuration has been explained for explanation of the features of the embodiment, and the above described configuration of the robot system 1 is not limited to the above described configuration example. Further, exclusion of configurations of general robot systems is not intended.

For example, the example of six joints (six axes) has been shown in FIG. 1, however, the number of joints (also referred to as "number of axes") and the number of links may be increased or decreased. Further, shapes, sizes, arrangements, structures, etc. of various members including the joints, links, and hands may be changed as appropriate.

For example, the positions where the imaging devices 30 are provided are not particularly limited, but may be on the ceiling or walls. Further, in place of or addition to the imaging devices 30, an imaging device may be provided on the distal end of the arm 22, a trunk, or a head of the robot 20. Furthermore, for example, the imaging devices 30 may be connected to the robot 20. In this case, the images taken by the imaging devices 30 are input to the robot controller 10 via the robot 20. The robot controller 10 may be built in the robot 20.

Figure 2:
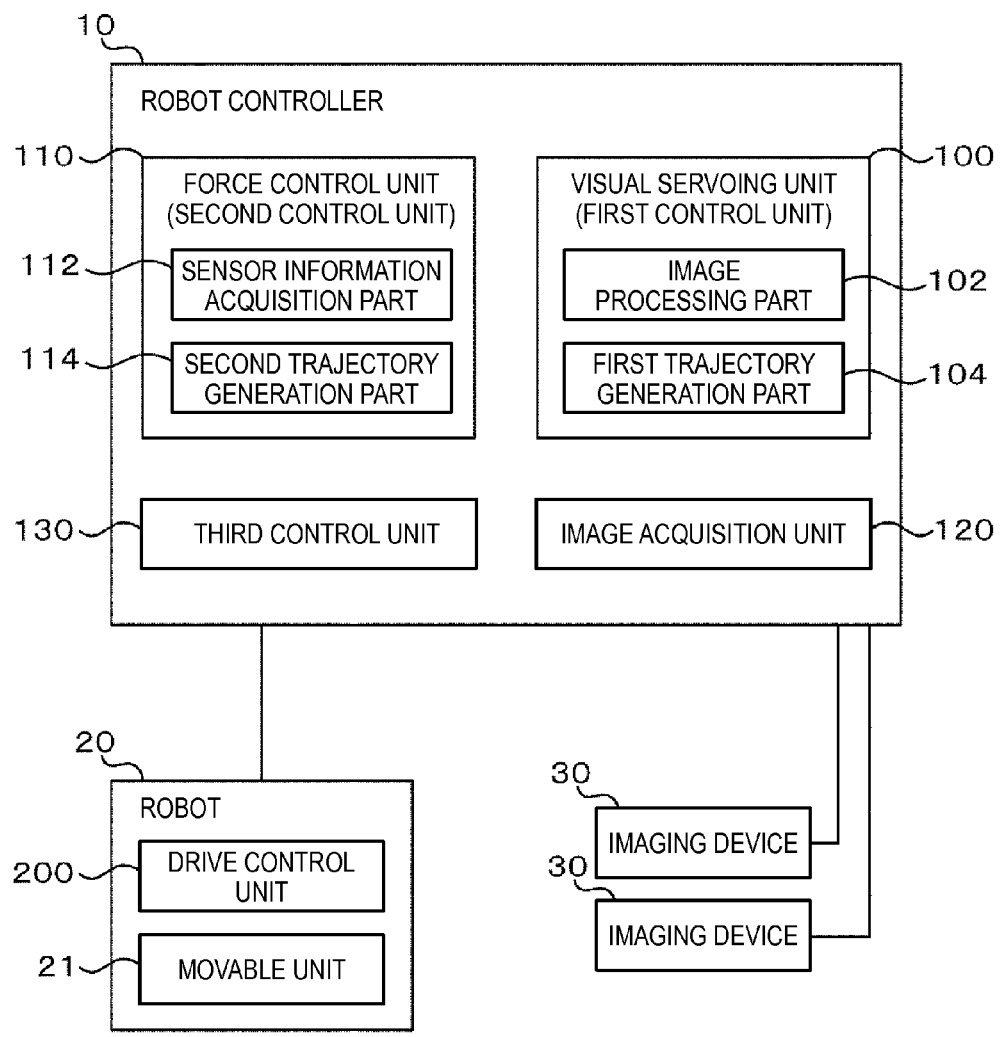
FIG. 2 shows an example of a function configuration of the robot system.

FIG. 2 shows an example of a function configuration of the robot system 1.

The robot 20 has the drive control unit 200.

The drive control unit 200 drives the actuators based on a control command output from the robot controller 10 and the encoder values of the actuators, the sensor value of the sensor, etc. so that the position of the end point may be a target position commanded by the control command. The current position of the end point may be obtained from the encoder values or the like in the actuators, for example.

The robot controller 10 has a visual servoing unit (first control unit) 100, a force control unit (second control unit) 110, an image acquisition unit 120, and a third control unit 130. The visual servoing unit 100 has an image processing part 102 and a first trajectory generation part 104. The force control unit 110 has a sensor information acquisition part 112 and a second trajectory generation part 114.

The visual servoing unit 100 acquires images taken by the imaging devices 30 via the image acquisition unit 120. Further, the visual servoing unit 100 measures position changes relative to a target object as visual information based on the acquired images, executes visual servoing as a technique of tracking the target object using the information as feedback information, and thereby, moves the arms 22. Note that, in the embodiment, as the visual servoing, a position-based technique of controlling a robot based on three-dimensional position information of an object calculated using a method of stereogram for stereoscopic recognition of an image using two images with parallax is employed. As the visual servoing, an image-based technique of controlling a robot based on feature quantities extracted from a target image and feature quantities extracted from a current image may be employed.

The image processing part 102 recognizes the end point from the images acquired from the image acquisition unit 120, and extracts images containing the recognized end point. General various technologies may be used for image recognition processing performed by the image processing part 102, and the explanation is omitted.

The first trajectory generation part 104 sets the trajectory of the end point, i.e., the amount of movement and the direction of movement of the end point based on the image extracted by the image processing part 102 (hereinafter, referred to as "current image") and an image when the end point is in the target position (hereinafter, referred to as "target image"). The target image may be acquired in advance and stored in a storage unit such as a memory.

Further, the first trajectory generation part 104 determines target angles of the respective actuators provided in the respective joints 23 based on the set amount of movement and direction of movement of the end point. Furthermore, the first trajectory generation part 104 generates a command value for moving the arm 22 by the target angles and outputs the value to the third control unit 130. General various technologies may be used for the generation processing of the trajectory, the determination processing of the target angles, the generation processing of the command value, etc. performed by the first trajectory generation part 104, and the detailed explanation is omitted.

The force control unit 110 performs force control (also referred to as "force sense control") based on sensor information (sensor values indicating force information and moment information) from the force sensor 25 of the robot 20. In the embodiment, impedance control is performed as the force control. The impedance control is a control method of position and force for setting mechanical impedance (inertia, attenuation coefficient, rigidity) generated when a force is externally applied to the terminal of the robot (hand 26 or the like) to values convenient to an intended operation. Specifically, for example, in a model in which a mass, a viscosity coefficient, and an elastic element are connected to the end effector part of the robot, the control is performed so that the end effector may be in contact with an object with the mass, the viscosity coefficient, and the elastic coefficient set as targets.

Note that, for force control, it is necessary to detect the force and the moment applied to the end effector such as the hand 26, however, the method of detecting the force and the moment applied to the end effector is not limited to that using the force sensor. For example, an external force on the end effector may be estimated from torque values of the respective axes of the arm 22. Therefore, for the force control, it is only necessary that the arm 22 has means for directly or indirectly acquiring the force applied to the end effector.

The sensor information acquisition part 112 acquires sensor information (detected sensor values etc.) output from the force sensor 25 of the robot 20. The sensor information acquisition part 112 may be referred to as "force detection unit".

The second trajectory generation part 114 determines the direction of movement and the amount of movement of the end point by the impedance control. Further, the second trajectory generation part 114 determines target angles of the respective actuators provided in the respective joints 23 based on the direction of movement and the amount of movement of the end point. Furthermore, the second trajectory generation part 114 generates a command value for moving the arm 22 by the target angles and outputs the value to the third control unit 130. General various technologies may be used for the generation processing of the trajectory, the determination processing of the target angles, the generation processing of the command value, etc. performed by the second trajectory generation part 114, and the detailed explanation is omitted.

In the robot 20 having the joints, when the angles of the respective joints are determined, the position of the end point is uniquely determined by forward kinematics processing. That is, in an N-joint robot, one target position may be represented by N joint angles, and thus, supposing that a set of N joint angles are one target joint angle, a trajectory of the end point may be considered as a collection of target joint angles. Accordingly, the command values output from the first trajectory generation part 104 and the second trajectory generation part 114 may be values with respect to the position (target position) or values with respect to the angles of the joints (target angles).

The image acquisition unit 120 acquires the images taken by the imaging devices 30 and outputs the images to the visual servoing unit 100 and the third control unit 130.

The third control unit 130 combines the command value output from the visual servoing unit (first control unit) 100 and the command value output from the force control unit (second control unit) 110 using weights that have been respectively set. Further, the third control unit 130 outputs commands to the robot 20 to move the position of the end point, i.e., the movable unit 21 based on the combined command value.

Furthermore, the third control unit 130 recognizes the two positions (e.g., the current position of the endpoint and the target position of the end point) from the images acquired from the image acquisition unit 120, and calculates a distance from the current position to the target position. Then, the unit sets a ratio of weights for combination of the command values in response to the length of the calculated distance. In addition, the third control unit 130 has a function of acquiring the sensor information output from the force sensor 25 of the robot 20 (may be referred to as "force detection unit"). The details of the processing of the third control unit 130 will be described later.

Figure 3:
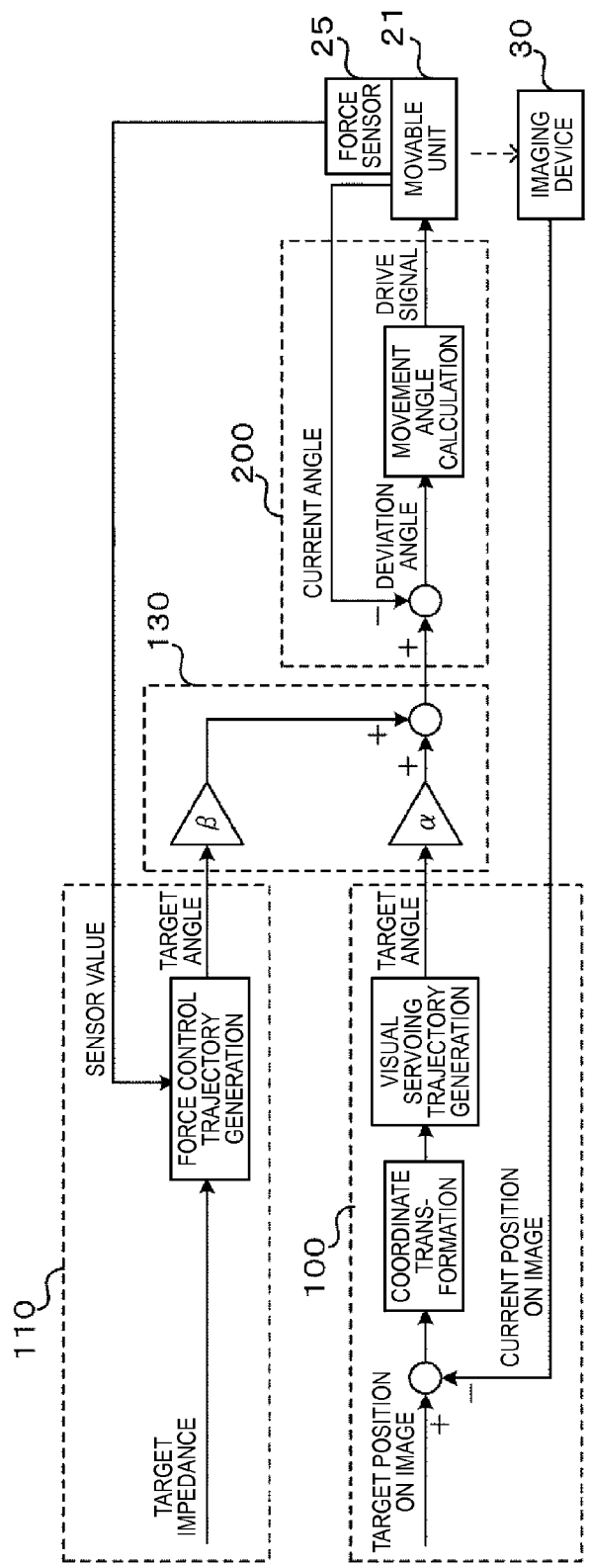
FIG. 3 shows an example of a flow of data and control in the robot system.

FIG. 3 shows an example of a flow of data and control in the robot system 1.

In the visual servoing unit 100, a visual feedback loop for making the current position closer to the target position using the information from the imaging devices 30 is turned. The first trajectory generation part 104 acquires a target image as information on the target position. Further, the first trajectory generation part 104 converts the current image and the target position on the current image represented in the coordinate system on the image into those in the coordinate system in the robot. Furthermore, the first trajectory generation part 104 generates the trajectory and the command value (here, the target angles) based on the current image and the target image after conversion.

In the force control unit 110, a feedback loop for bringing the terminal of the robot into contact with the object is turned with impedance set as a target (target impedance) based on the sensor information from the force sensor 25. The second trajectory generation part 114 generates the trajectory and the command value (here, the target angles) so that the values of the acquired sensor information may be the target impedance.

The third control unit 130 outputs a command value based on the command value output from the first trajectory generation part 104 and the command value output from the second trajectory generation part 114 to the robot 20. Specifically, the third control unit 130 multiplies the command value output from the first trajectory generation part 104 by a weight $\alpha$ ($0 \leq \alpha \leq 1$), multiplies the command value output from the second trajectory generation part 114 by a weight $\beta$ ($\beta = 1 - \alpha$), and outputs a command value as a combination of the values to the robot 20. The weight $\alpha$ and the weight $\beta$ are values representing the ratio for combination of the command value of visual servoing and the command value of force control. The method of setting the ratio between $\alpha$ and $\beta$ will be described later.

Generally, the load of image processing is higher, and it is assumed that intervals at which the visual servoing unit 100 outputs the command value (e.g., every 30 milliseconds (msec)) are longer than intervals at which the force control unit 110 outputs the command value (e.g., every one millisecond (msec)). In this case, when the command value is not output from the visual servoing unit 100, the third control unit 130 may multiply the command value output from the force control unit 110 by the weight $\alpha$, finally multiply the command value output from the visual servoing unit 100 by the weight $\beta$, and output a combination of the values to the robot 20. The third control unit 130 may temporarily store the command value finally output from the visual servoing unit 100 in a storage unit such as a memory, and read out and use the command value.

The drive control unit 200 acquires the command value (target angles) from the robot controller 10. The drive control unit 200 acquires the current angles based on the encoder values or the like of the respective actuators provided in the respective joints 23, and calculates differences between the target angles and the current angles (deviation angles). Further, the drive control unit 200 calculates a movement speed of the arm 22 based on the deviation angles (for example, the movement speed is made faster as the deviation angles are larger), and moves the movable unit 21 by the deviation angles calculated from the calculated movement speed.

Figure 4:
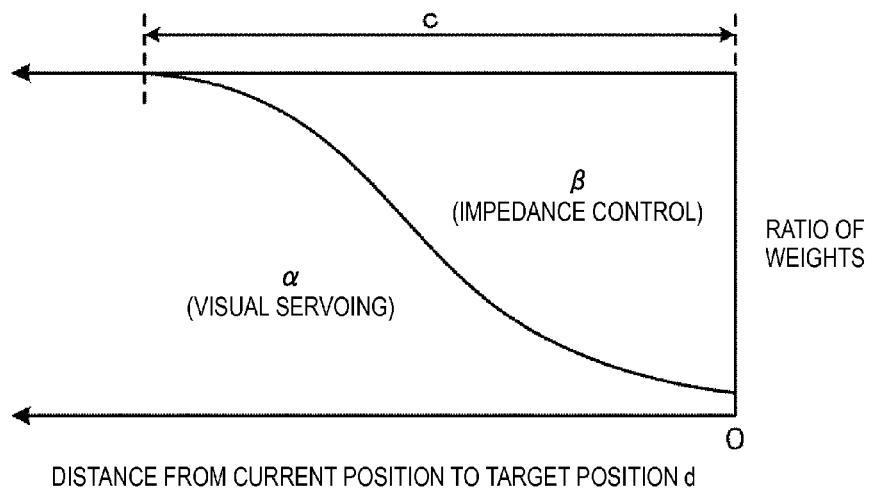
FIG. 4 is a diagram for explanation of an example of a method of setting weights representing ratios for combination of command values.

FIG. 4 is a diagram for explanation of an example of a method of setting the weights representing the ratios for combination of the command values. FIG. 4 shows a graph in which the vertical axis indicates the ratio of the weight $\alpha$ and the weight $\beta$ and the horizontal axis indicates the distance from the current position to the target position. Here, $\alpha + \beta = 1$ as described above.

The current position may be the current position of the end point, for example. Further, the target position may be the position of the end point in the target image, for example. Obviously, the current position and the target position are not limited to the positions of the end point. For example, the current position may be a position of a specific point of a work W grasped by the hand 26 and the target position may be a position of the work W in the target image.

In the example of FIG. 4, the relationship between the distance d from the current position to the target position and the ratio between the weights is such that the ratio of the factor α monotonically decreases (the ratio of the factor β monotonically increases) as the distance d from the current position to the target position is smaller. The change of ratio may be curvedly or linearly. The robot controller 10 may accept setting of the change of ratio from a user via an input unit such as a keyboard, for example.

Further, in the example of FIG. 4, when the distance d is smaller than a predetermined distance c, the ratio of the factor α changes to decrease from the maximum value "1". The predetermined distance c may be set to a distance assumed such that the effect of the force control is effectively obtained. A method of setting the predetermined distance will be explained by taking an operation of fitting the work W1 into the hole H of the work W2 as an example with reference to FIGS. 5 to 8.

Figure 5:
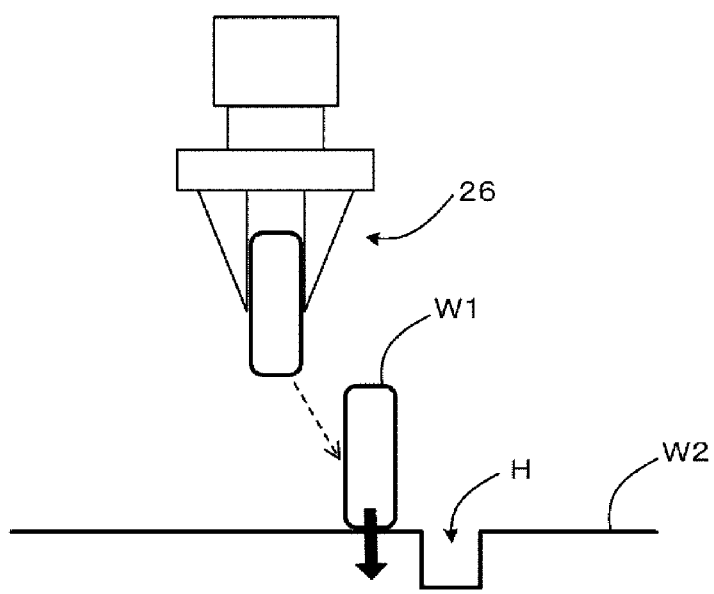
FIG. 5 is a diagram for explanation of an example of a fitting operation by force control.
Figure 6:
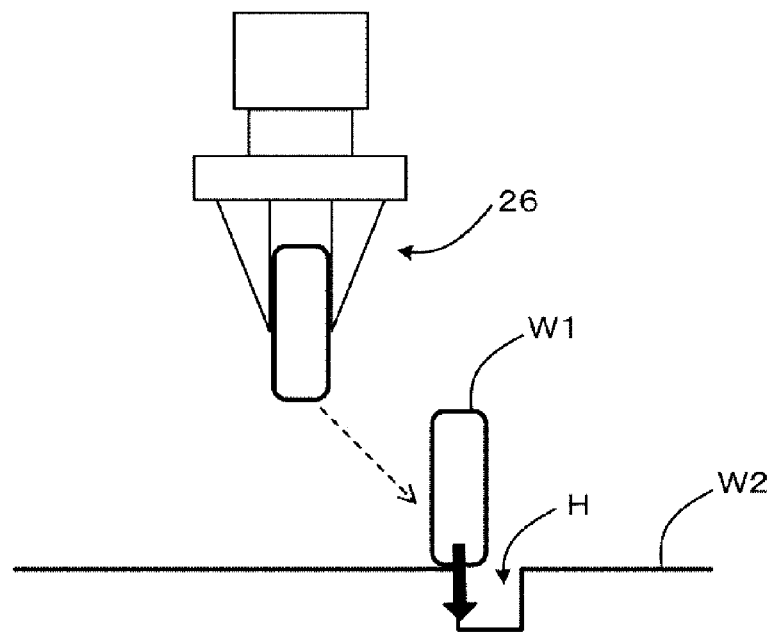
FIG. 6 is a diagram for explanation of an example of a fitting operation by force control.

For example, as shown in FIG. 5 (a diagram for explanation of an example of a fitting operation by force control), the case where the position of the contact surface between the work W1 and the work W2 is located in a farther position not reaching the edge of the hole H as a result of the movement of the work W1 is considered. In this case, if the impedance control is started when the work W1 comes into contact with the work W2 and the work W1 is pressed against the work W2, the work W1 does not enter the hole H. That is, the effect of the impedance control is not obtained. On the other hand, as shown in FIG. 6 (a diagram for explanation of an example of a fitting operation by force control), the case where the position of the contact surface between the work W1 and the work W2 is located in a position reaching the edge of the hole H as a result of the movement of the work W1 is considered. In this case, if the impedance control is started when the work W1 comes into contact with the work W2 and the work W1 is pressed against the work W2, the work W1 is easily fitted in the hole H. That is, the effect of the impedance control is obtained. As described above, the smaller the distance d, the higher the possibility of obtaining the effect of the impedance control.

Accordingly, for example, supposing that a distance at which the effect of the impedance control is not obtained is c1 (e.g., 2 mm) and the accuracy error of the movement of the robot 20 is c2 (e.g., 3 mm), the distance c may be defined as c=c1+c2. It is desirable that the user adjusts the setting of the distance c in response to the operation content and the robot specifications. The robot controller 10 may accept the setting of the distance c from the user via an input unit such as a keyboard, for example.

Figure 7:
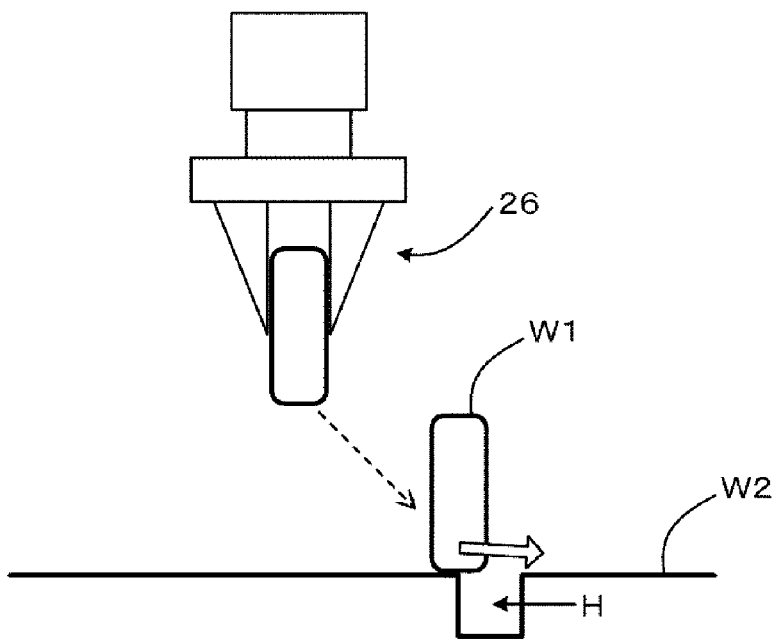
FIG. 7 is a diagram for explanation of an example of a fitting operation by visual servoing.
Figure 8:
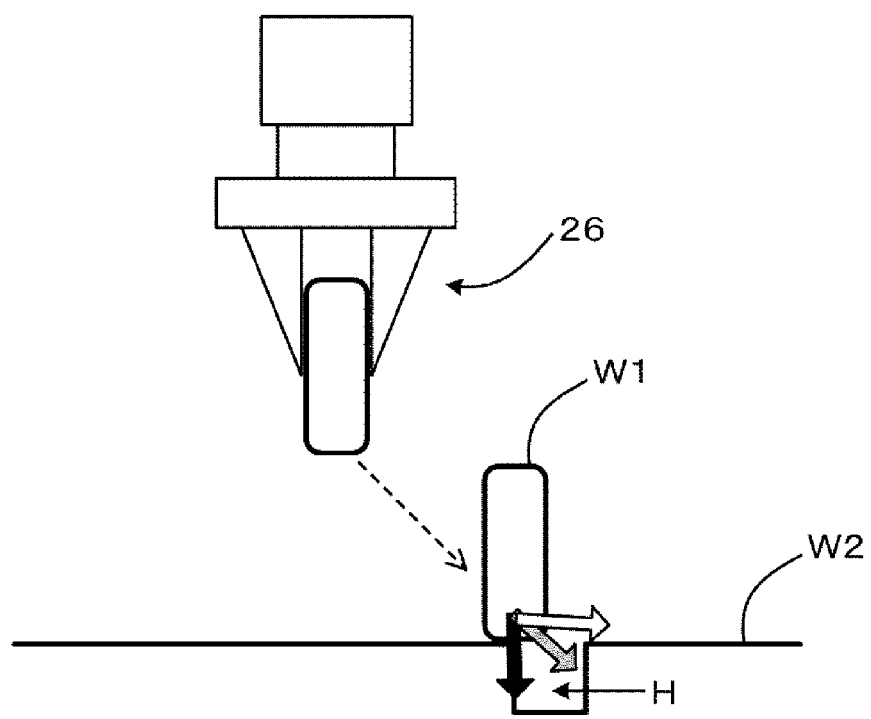
FIG. 8 is a diagram for explanation of an example of a fitting operation by parallel control of force control and visual servoing.

Incidentally, for example, as shown in FIG. 7 (a diagram for explanation of an example of a fitting operation by visual servoing), the case where the position of the contact surface between the work W1 and the work W2 is located in a position reaching the edge of the hole H as a result of the movement of the work W1 is considered. In this case, if the impedance control is not started when the work W1 comes into contact with the work W2, but the work W1 is moved by visual servoing, according to the circumstances, the end point may move in a trajectory long way around, not the shortest, i.e., an inefficient trajectory. On the other hand, as shown in FIG. 8 (a diagram for explanation of an example of a fitting operation by parallel control of force control and visual servoing), the case where the position of the contact surface between the work W1 and the work W2 is located in a position reaching the edge of the hole H as a result of the movement of the work W1 is considered. In this case, if the impedance control is started when the work W1 comes into contact with the work W2, the trajectory of the endpoint by visual servoing is corrected to a trajectory by impedance control, and thereby, the possibility of fitting the work W1 in the hole H in the more efficient trajectory is higher.

The third control unit 130 acquires images from the image acquisition unit 120 at arbitrary intervals such as intervals at which the force control unit 110 outputs the command value, for example, recognizes the two positions (e.g., the current position of the end point and the target position of the end point) by image processing, and calculates the distance from the current position to the target position. Further, the third control unit 130 acquires the values of the weight α and the weight β corresponding to the calculated distance based on the calculated distance and the relationship between the distance and the weight ratio, and sets them as the weights used for combination of the command values. Note that a table in which the relationship between the distance and the weight ratio is defined may be stored in the storage unit in advance and the third control unit 130 may determine the weight ratio by referring to the table, or the third control unit 130 may determine the weight ratio using a predetermined function formula.

As described above, the respective command values of visual servoing and force control are used at the same time (parallel control is performed), and thereby, even when the object differs in position, the position may be corrected by visual servoing with higher accuracy. Further, even when the trajectory by visual servoing is ineffective, it may be corrected to an efficient trajectory by force control.

As the distance between the current position and the target position is larger, the ratio of the command value of force control is smaller than the ratio of the command value of visual servoing. Accordingly, in a position like a position farther from the target position where the effect of force control is not effectively obtained, the movable unit may be moved more efficiently by visual servoing.

As the distance between the current position and the target position is smaller, the ratio of the command value of visual servoing is smaller than the ratio of the command value of force control. Accordingly, in a position like a position closer to the target position where the effect of force control is obtained more effectively, the inefficient trajectory by visual servoing may be corrected and the movable unit may be moved more efficiently.

Further, the weights are continuously changed (monotonically increased or monotonically decreased) in response to the distances to the target position. Accordingly, switching from visual servoing to force control may be made smoother.

Figure 9:
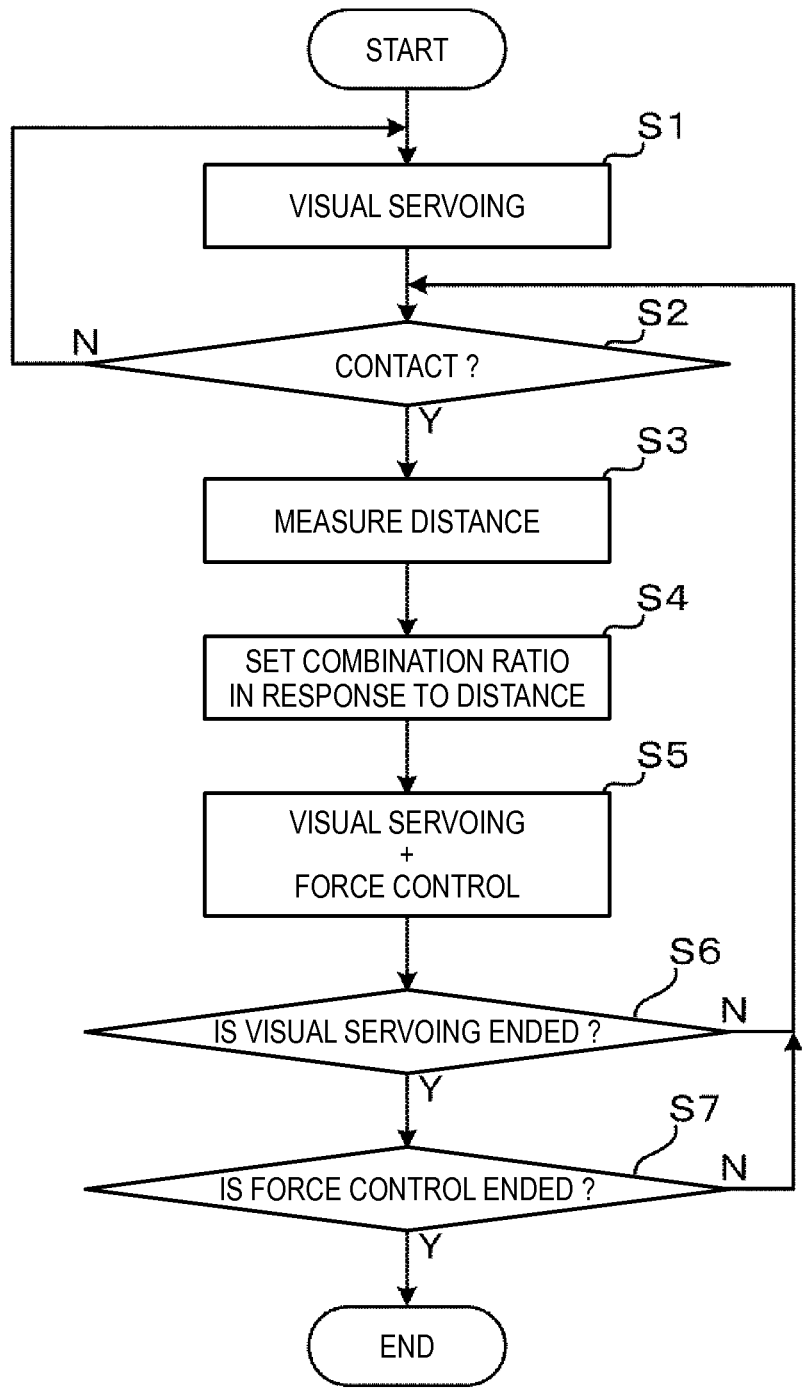
FIG. 9 is a flowchart showing an example of operation of a robot controller.

FIG. 9 is a flowchart showing an example of operation of the robot controller 10. The processing is started when an operation start command is input via a button or the like (not shown), for example. In FIG. 9, an operation of fitting the work W1 in the hole H of the work W2 is considered. For example, the operation follows a flow in which the work W1 moves from an initial position by visual servoing, the work once comes into contact with a vicinity of the hole H of the work W2, and then, the work W1 is fitted in the hole H by visual servoing and impedance control.

When the flow in FIG. 9 is started, the third control unit 130 moves the end point using the visual servoing unit 100 (step S1). Further, the third control unit 130 acquires sensor information from the force sensor 25 of the robot 20, and determines whether or not an external force has been applied to the terminal of the robot based on the acquired sensor information (step S2). If any external force has not been applied to the terminal of the robot (N at step S2), the third control unit 130 continues processing at step S1.

If an external force has been applied to the terminal of the robot (Y at step S2), the third control unit 130 measures the distance d from the current position to the target position of the end point (step S3). Further, the third control unit 130 sets the weight ratio corresponding to the measured distance d based on the distance d measured at step S3 and the table in which the relationship between the distance and the weight $\alpha$ and the weight $\beta$ is defined (step S4).

Then, the third control unit 130 moves the end point using the visual servoing unit 100 and the force control unit 110 (step S5). Specifically, as described above, the visual servoing unit 100 and the force control unit 110 respectively calculate command values. The third control unit 130 multiplies the command value output from the visual servoing unit 100 by the factor $\alpha$ set at step S4, multiplies the command value output from the force control unit 110 by the factor $\beta$ set at step S4, and outputs a command value as a combination of the values to the robot 20.

Further, the visual servoing unit 100 determines whether or not a condition for ending visual servoing is fulfilled (step S6). For example, the visual servoing unit 100 obtains a difference between the target image and the current image and, if the difference is equal to or less than a predetermined threshold value, determines ending of visual servoing. If the condition for ending visual servoing is not fulfilled (N at step S6), the visual servoing unit 100 returns the processing to step S2.

If the condition for ending visual servoing is fulfilled (Y at step S6), the force control unit 110 determines whether or not a condition for ending force control is fulfilled (step S7). For example, if an external force applied to the terminal of the robot is equal to or more than a predetermined threshold value, the force control unit 110 determines ending of force control based on the sensor information from the force sensor 25. If the condition for ending force control is not fulfilled (N at step S7), the force control unit 110 returns the processing to step S2. If the condition for ending force control is fulfilled (Y at step S7), the force control unit 110 ends the processing of the flowchart in FIG. 9.

Figure 10:
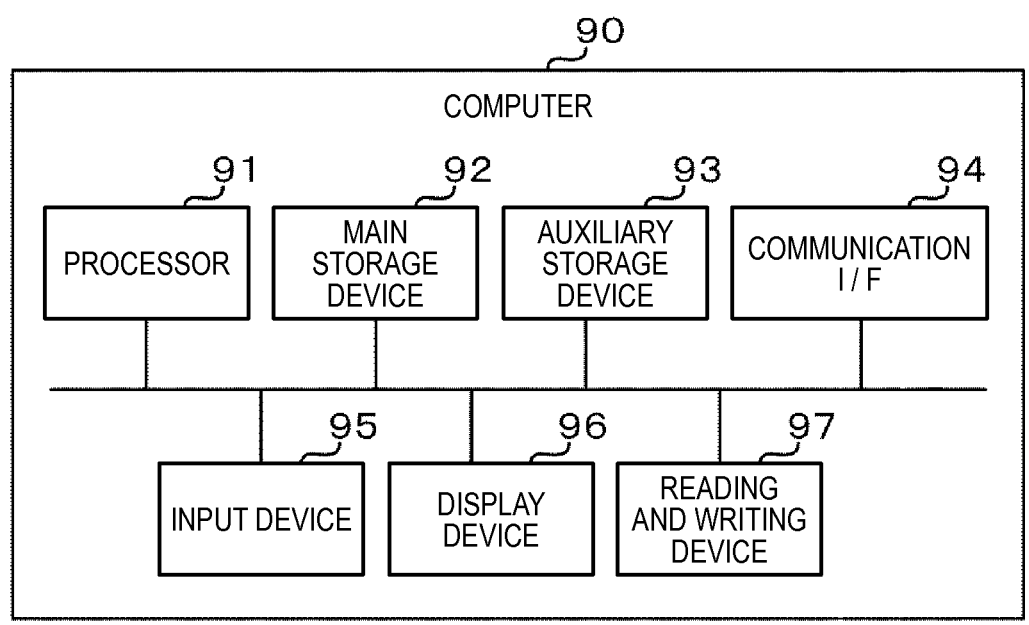
FIG. 10 shows an example of a hardware configuration for realizing functions of the robot controller.

FIG. 10 shows an example of a hardware configuration for realizing functions of the robot controller 10.

The robot controller 10 may be realized by a computer 90 including e.g., a processor 91 such as a CPU (Central Processing Unit), a main storage device 92 such as a RAM (Random Access Memory), an auxiliary storage device 93 such as an HDD (Hard Disk Drive), a communication interface (I/F) 94 for wired or wireless connection to a communication network, an input device 95 such as a mouse, a keyboard, a touch sensor, and a touch panel, a display device 96 such as a liquid crystal display, and a reading and writing device 97 that reads and writes information in a portable storage medium such as a DVD (Digital Versatile Disk) as shown in FIG. 10.

For example, the functions of the visual servoing unit 100, the force control unit 110, the image acquisition unit 120, the third control unit 130, etc. are realized by the processor 91 executing predetermined programs loaded from the auxiliary storage device 93 or the like to the main storage device 92. The input unit is realized by the processor 91 using the input device 95, for example. The storage unit is realized by the processor 91 using the main storage device 92 or the auxiliary storage device 93, for example. The communication functions with the robot 20 and the imaging devices 30 are realized by the processor 91 using the communication I/F 94, for example. Incidentally, the predetermined programs may be installed from a storage medium read by the reading and writing device 97 or installed from the network via the communication I/F 94.

The drive control unit 200 of the robot 20 is realized by a controller board including an ASIC (Application Specific Integrated Circuit) having a processor, a storage device, a circuit, etc., for example.

The above described function configuration of the robot system 1 is classified according to the main processing contents for facilitation of understanding of the configuration of the robot system 1. The invention is not limited by the way of classification and names of the component elements. The configuration of the robot system 1 may be classified into more component elements according to the processing contents. Further, one component element may be classified to execute more processing. Furthermore, the processing of the respective component elements may be executed by single hardware or multiple hardware.

Assignation of the functions and processing to the robot controller 10 and the robot 20 is not limited to the illustrated example. For example, at least part of the functions of the robot controller 10 may be contained in the robot 20 and realized by the robot 20. Further, at least part of the functions of the robot 20 may be contained in the robot controller 10 and realized by the robot controller 10.

The above described respective units of processing of the flowchart are divided according to the main processing contents for facilitation of understanding of the processing of the robot controller 10. The invention is not limited by the way of division and names of the units of processing. The processing of the robot controller 10 may be divided into more units of processing according to the processing contents. Further, one unit of processing may be divided to contain more processing.

As above, the embodiment has been explained. According to the embodiment, even when an object differs in position in operation by a robot, the object may be efficiently moved to a target position.

Second Embodiment

Figure 11:
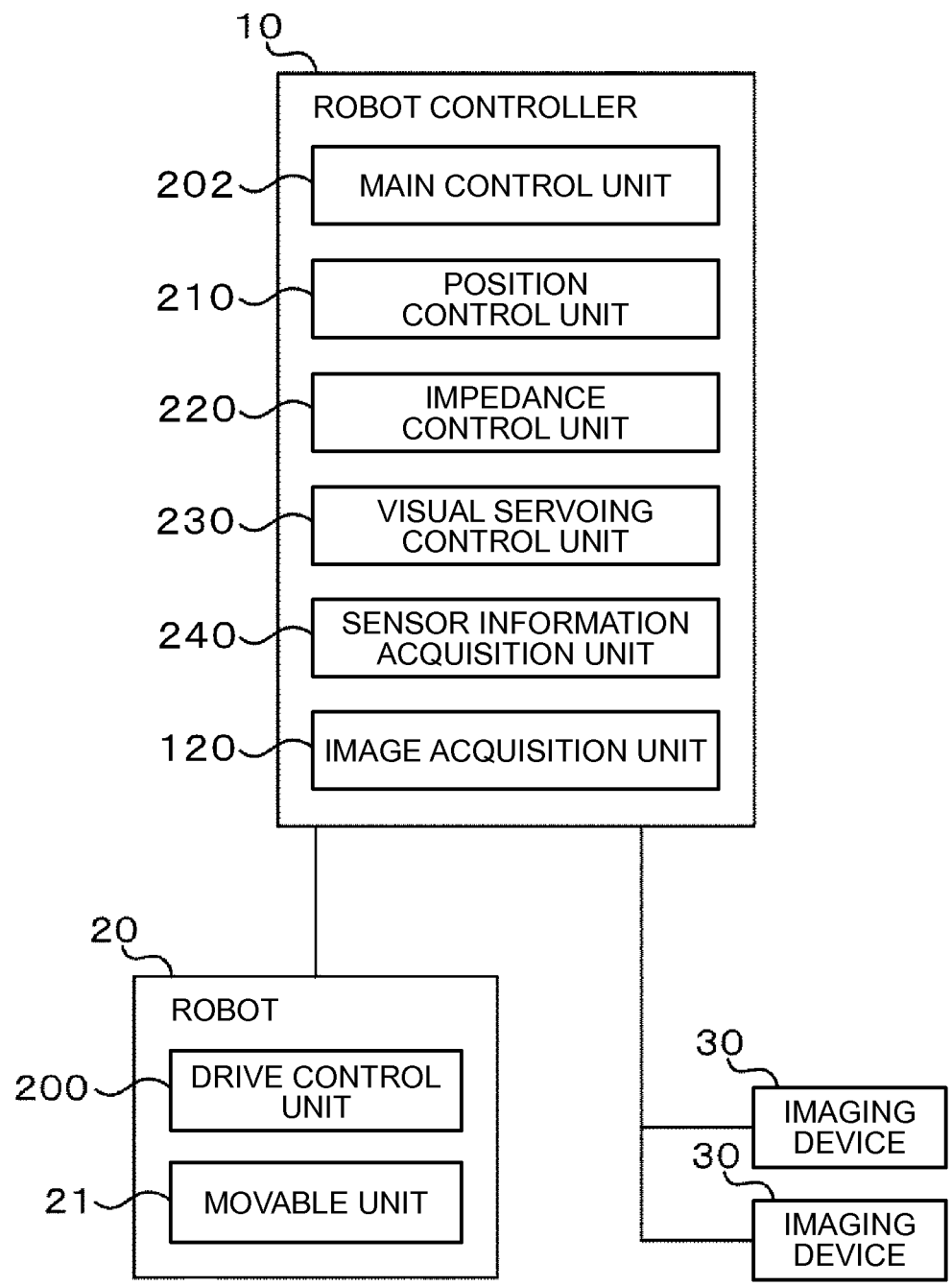
FIG. 11 shows an example of a function configuration of the robot system.

FIG. 11 shows an example of a function configuration of the robot system 1.

As below, the embodiment of the robot system 1 will be explained with reference to the drawing, and the explanation will be made with a focus on the differences from the above described embodiment and the explanation of the same items will be omitted.

The robot controller 10 has a main control unit 202, a position control unit 210, an impedance control unit 220, a visual servoing control unit 230, a sensor information acquisition unit 240, and an image acquisition unit 120.

The position control unit 210, the impedance control unit 220, and the visual servoing control unit 230 may be respectively referred to as "first control unit" and the main control unit 202 may be referred to as "second control unit".

The main control unit 202 synchronizes the times of processing of calculating movement command values of the respective controls by the respective control units (position control unit 210, impedance control unit 220, and visual servoing control unit 230). Further, the main control unit 202 synchronizes the times of processing of outputting the movement command values to the main control unit 202 by the respective control units. The synchronization control will be described later in detail.

Furthermore, the main control unit 202 sets weights by which the movement command values of the respective controls are multiplied for the respective control units (position control unit 210, impedance control unit 220, and visual servoing control unit 230). The main control unit 202 acquires the movement command values (weighted movement command values) from the respective control units and combines the values. The main control unit 202 outputs a control command containing the combined movement command value to the robot 20 to move the position of the end point, i.e., the movable unit 21 based on the combined movement command value. Note that "combine" means summing the respective movement command values, for example, however, another calculation method may be used.

In the embodiment, the respective controls (position control, impedance control, and visual servoing control) by the respective control units (position control unit 210, impedance control unit 220, and visual servoing control unit 230) may be individually started and ended at arbitrary times. Therefore, at a certain point of time, one of the respective controls may be singly operated or two of the respective controls may be operated in parallel. The start conditions and the end conditions of the respective controls are set by a user in advance, for example. The robot controller 10 accepts settings of the start conditions and the end conditions from the user via the input device 95 such as a keyboard or the communication interface 94, for example. The contents of the start conditions and the end conditions are not particularly limited, but, for example, an arbitrary position on a route, time, a distance between an object and the end point, or the like may be used.

Further, in the embodiment, the weights by which the movement command values output by the respective control units (position control unit 210, impedance control unit 220, and visual servoing control unit 230) are multiplied are set by the user in advance, for example. The main control unit 202 accepts the setting of the weights from the user via the input device 95 such as a keyboard or the communication interface 94, for example. More specifically, suppose that the weights for the respective controls (position control, impedance control, and visual servoing control) are set to a weight α, a weight β, a weight γ, respectively. The main control unit 202 accepts the respective settings of the above described weights of the respective controls. Obviously, the weights of the respective controls may be equal.

As described above, setting of parallel operation of controls of the respective controls (position control, impedance control, and visual servoing control) can be made, and accordingly, the control may be switched from single operation to parallel operation or switched from parallel operation to single operation. Thereby, overload of motors and vibrations of the robot generated by switching from single operation of a control to single operation of another control may be suppressed. Further, the movement command values of the respective controls may be multiplied by the weights, and accordingly, more flexible settings may be made for suppressing overload of motors and vibrations of the robot in response to the operation contents of the robot.

Note that "parallel" used in the embodiment includes not only the case where a plurality of operations, controls, pieces of processing, etc. are executed completely in parallel using a plurality of processors but also the case they are executed substantially in parallel by priority control of tasks or the like using one processor.

The position control unit 210 executes position control of moving the end point along a preset movement route of the robot.

For example, the position control unit 210 acquires information on the route. The route refers to a route formed by connecting one or more taught positions set by teaching in advance in a preset and predetermined sequence. The information on the route includes information that specifies coordinates of the respective taught positions and the sequence of the respective taught positions on the route. The information on the route is held in a storage unit such as a memory, for example. The position control unit 210 may accept settings of the information on the route from the user via the input device 95 such as a keyboard, for example.

Further, for example, the position control unit 210 determines a trajectory of the endpoint, i.e., amounts of movement and directions of movement of the end point in time series based on the acquired information on the route. Furthermore, the position control unit 210 determines the next movement position (the target angles of the respective actuators provided in the joints 23) of the end point based on the determined amount of movement and direction of movement. The position control unit 210 generates a movement command value for moving the endpoint by the target angles and outputs the value to the main control unit 202. When the weight is set, the position control unit 210 multiplies the generated movement command value by the weight, and then, outputs the value to the main control unit 202.

The impedance control unit 220 performs impedance control (also referred to as force control or force sense control) based on the sensor information (sensor values indicating force information and moment information) from the force sensor 25 of the robot 20. The impedance control is a control method of position and force for setting mechanical impedance (inertia, attenuation coefficient, rigidity) generated when a force is externally applied to the terminal of the robot (hand 26 or the like) to values convenient to an intended operation. For example, in a model in which a mass, a viscosity coefficient, and an elastic element are connected to the end effector part of the robot, the control is performed so that the end effector may be in contact with an object with the mass, the viscosity coefficient, and the elastic coefficient set as targets.

For example, the impedance control unit 220 determines the amounts of movement and directions of movement of the endpoint in time series based on the sensor information acquired from the force sensor 25 via the sensor information acquisition unit 240 so that the impedance set as the target (target impedance) may be obtained. Further, the impedance control unit 220 determines the next movement position (the target angles of the respective actuators provided in the joints 23) based on the determined amount of movement and direction of movement. The impedance control unit 220 generates a movement command value for moving the end point by the target angles and outputs the value to the main control unit 202. When the weight is set, the impedance control unit 220 multiplies the generated movement command value by the weight, and then, outputs the value to the main control unit 202.

The method of detecting the force and the moment applied to the end effector is not limited to that using the force sensor. For example, an external force on the end effector may be estimated from torque values of the respective axes of the arm 22. Therefore, for the impedance control, it is only necessary that the arm 22 has means for directly or indirectly acquiring the force applied to the end effector. Incidentally, in place of the impedance control, other force control including hybrid control and compliance control may be performed.

The visual servoing control unit 230 measures position changes relative to a target object as visual information based on the images acquired from the imaging devices 30, executes visual servoing as a technique of tracking the target object using the information as feedback information, and thereby, moves the movable unit 21. Note that, in the embodiment, a position-based technique of controlling a robot based on three-dimensional position information of an object calculated using a method of stereogram for stereoscopic recognition of an image using two images with parallax is employed. As the visual servoing, an image-based technique of controlling a robot based on feature quantities extracted from a target image and feature quantities extracted from a current image may be employed.

For example, the visual servoing control unit 230 acquires images containing the end point from the imaging devices 30 via the image acquisition unit 120. The end point may be recognized from the acquired images. General various technologies may be used for image recognition processing performed by the visual servoing control unit 230, and the explanation is omitted.

For example, the visual servoing control unit 230 determines a trajectory of the end point, i.e., amounts of movement and directions of movements of the end point based on the acquired image (hereinafter, referred to as "current image") and an image when the end point is in a target position (hereinafter, referred to as "target image"). The target image may be acquired in advance and stored in a storage unit such as a memory. Further, the visual servoing control unit 230 determines the next movement position (the target angles of the respective actuators provided in the joints 23) based on the determined amount of movement and direction of movement of the end point. The visual servoing control unit 230 generates a movement command value for moving the end point by the target angles and outputs the values to the main control unit 202. When the weight is set, the visual servoing control unit 230 multiplies the generated movement command value by the weight, and then, outputs the value to the main control unit 202.

In the robot 20 having the joints, when the angles of the respective joints are determined, the position of the end point is uniquely determined by forward kinematics processing. That is, in an N-joint robot, one position may be represented by N joint angles, and thus, supposing that a set of N joint angles are one target joint angle, the trajectory of the end point may be considered as a collection of target joint angles. Accordingly, the movement command values output from the respective control units may be values with respect to the positions or values with respect to the angles (target angles). The same applies to the movement command values output by the main control unit 202.

The sensor information acquisition unit 240 acquires sensor information (detected sensor values or the like) output from the force sensor 25 of the robot 20. The sensor information acquisition unit 240 may be referred to as "force detection unit".

The image acquisition unit 120 acquires the images taken by the imaging devices 30 and outputs the images to the visual servoing control unit 230 etc.

The robot 20 has a drive control unit 200.

The drive control unit 200 drives the actuators based on a control command containing the movement command value output from the robot controller 10 and the encoder values of the actuators, the sensor values of the sensors, etc. so that the position of the end point may be the target position represented by the movement command value. The current position of the end point may be obtained from the encoder values or the like in the actuators, for example.

For example, the drive control unit 200 acquires the movement command value (target angles) from the robot controller 10. The drive control unit 200 acquires the current angles based on the encoder values or the like of the respective actuators provided in the respective joints 23, and calculates differences between the target angles and the current angles (deviation angles). Further, the drive control unit 200 calculates the movement speed of the arm 22 based on the deviation angles (for example, the movement speed is made faster as the deviation angles are larger), and moves the movable unit 21 by the deviation angles calculated from the calculated movement speed.

Next, the parallel processing of the respective controls (position control, impedance control, and visual servoing control) performed in the robot controller 10 will be explained.

Figure 12:
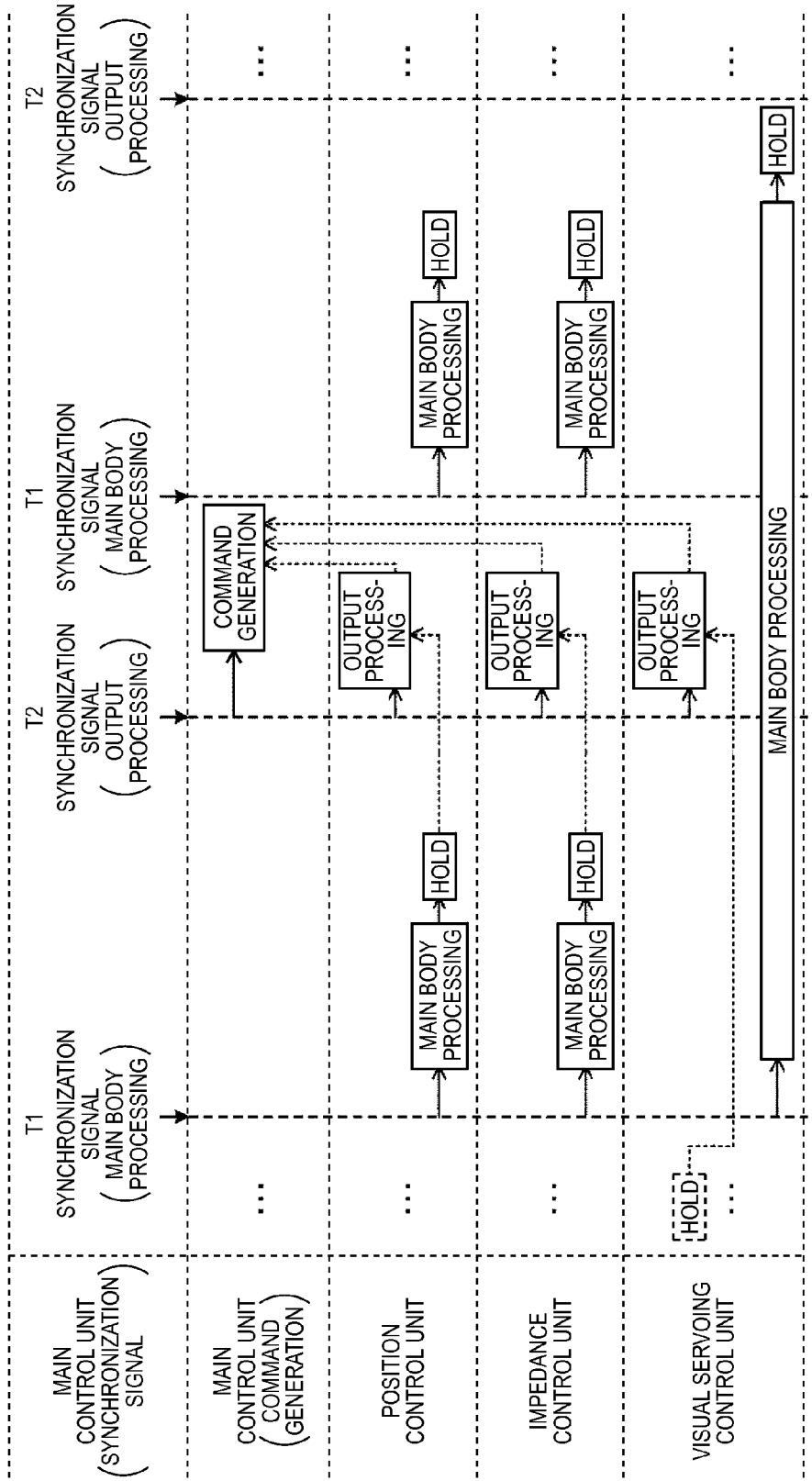
FIG. 12 is a diagram for explanation of an example of parallel processing of the respective controls in the robot controller.

FIG. 12 is a diagram for explanation of an example of the parallel processing of the respective controls in the robot controller 10. FIG. 12 shows the case where three controls (position control, impedance control, and visual servoing control) are operated in parallel.

The main control unit 202 sends a synchronization signal T1 that allows execution of processing of calculating the movement command values (hereinafter, also referred to "main body processing") to the respective control units (position control unit 210, impedance control unit 220, and visual servoing control unit 230) at predetermined intervals (e.g., 1 millisecond). Sending the synchronization signal T1 is also considered as commanding start of the main body processing to the respective control units.

Further, the main control unit 202 sends a synchronization signal T2 that allows execution of processing of outputting the movement command values (hereinafter, also referred to "output processing") to the respective control units (position control unit 210, impedance control unit 220, and visual servoing control unit 230) after a lapse of a predetermined time (e.g., 800 microseconds) from the synchronization signal T1. The predetermined time is shorter than the predetermined interval of the synchronization signal T1. Sending the synchronization signal T2 is also considered as commanding start of the output processing to the respective control units.

Here, for the interval from the synchronization signal T1 to the immediately following synchronization signal T2 (800 microseconds in the above described example), a sufficient time is set for execution of both the main body processing of the position control unit 210 and the main body processing of the impedance control unit 220. On the other hand, generally, visual servoing control contains image processing with heavy load and takes a longer processing time than those of the position control and the impedance control. Accordingly, the main body processing of the visual servoing control unit 230 is executed in a longer period than one interval of the synchronization signal T1.

The main body processing of the position control unit 210 and the main body processing of the impedance control unit 220 enters an executable state with the reception of the synchronization signal T1 as a trigger, the execution is started and ended from the synchronization signal T1 to the immediately following synchronization signal T2, and then, the processing enters a wait state. On the other hand, the main body processing of the visual servoing control unit 230 enters an executable state if the processing is in a wait state when the synchronization signal T1 is received and execution is started, however, if the processing is not in the wait state when the synchronization signal T1 is received, the main body processing being executed is continued.

The main body processing of the position control unit 210 and the main body processing of the impedance control unit 220 holds the movement command values calculated by the main body processing in a storage unit such as a memory. That is, in the position control and the impedance control, the movement command values for the latest single processing are held. On the other hand, the main body processing of the visual servoing control unit 230 holds the movement command value calculated by the main body processing in a storage unit such as a memory and further continuously holds the movement command value calculated by the previous main body processing in the storage unit. That is, in the visual servoing control, the movement command value of the latest single processing and the movement command value of the previous single processing are held. These two movement command values are used in interpolation processing, which will be described later.

For the interval from the synchronization signal T2 to the immediately following synchronization signal T1 (200 microseconds in the above described example), a sufficient time is set for execution of all of the output processing of the position control unit 210, the output processing of the impedance control unit 220, and the output processing of the visual servoing control unit 230. Further, the interval from the synchronization signal T2 to the immediately following synchronization signal T1 is also a sufficient time for execution of command generation processing of the main control unit 202 of combining the movement command values of the respective controls and outputting the value to the robot 20 in addition to the output processing of the respective controls.

The output processing of the position control unit 210, the output processing of the impedance control unit 220, and the output processing of the visual servoing control unit 230 enters an executable state with the reception of the synchronization signal T2 as a trigger, the execution is started and ended from the synchronization signal T2 to the immediately following synchronization signal T1, and then, the processing enters a wait state. Note that, if the main body processing is being executed when the visual servoing control unit 230 receives the synchronization signal T2 and attempts to execute the output processing, the unit interrupts the execution of the main body processing and preferentially executes the output processing, and restarts the execution of the main body processing after the end of the output processing.

The output processing of the position control unit 210 outputs the last movement command value held in the storage unit to the main control unit 202. Further, the output processing of the impedance control unit 220 outputs the last movement command value held in the storage unit to the main control unit 202. As shown in FIG. 12, the output processing of the position control unit 210 and the impedance control unit 220 outputs results of the main body processing started with the synchronization signal T1 immediately before the synchronization signal T2 as the trigger to the main control unit 202.

On the other hand, the output processing of the visual servoing control unit 230 performs interpolation processing based on the last movement command value held in the storage unit and the movement command value held at the previous time, and outputs the movement command value after the interpolation processing to the main control unit 202. As shown in FIG. 12, in the visual servoing control, the last movement command value held in the storage unit is not a result of the main body processing started with the synchronization signal T1 immediately before the synchronization signal T2 as the trigger, but a result of the main body processing started with a synchronization signal T1 prior to the synchronization signal T1 immediately before the synchronization signal T2 as a trigger. The interpolation processing will be explained later with reference to FIG. 13.

The command generation processing of the main control unit 202 acquires the movement command values from the output processing of the respective control units (position control unit 210, impedance control unit 220, and visual servoing control unit 230) with the synchronization signal T2 as a trigger, and generates a movement command value to be output to the robot 20 by combining the movement command values.

As described above, in the embodiment, the processing of the respective controls (position control, impedance control, and visual servoing control) is divided into the main body processing and the output processing. Further, the output processing of the respective controls is executed with a constant period. In the output processing of the respective controls, the movement command values are output based on the results of the last main body processing. In this manner, even when a plurality of controls with different processing times for the main body processing are operated in parallel, the movement command value to the robot may be generated without lack of the movement command values of the respective controls. The case where the three controls (position control, impedance control, and visual servoing control) are operated in parallel has been explained using FIG. 12, however, the same applies to the case where parallel operation is performed in combination of two of the three controls.

Figure 13:
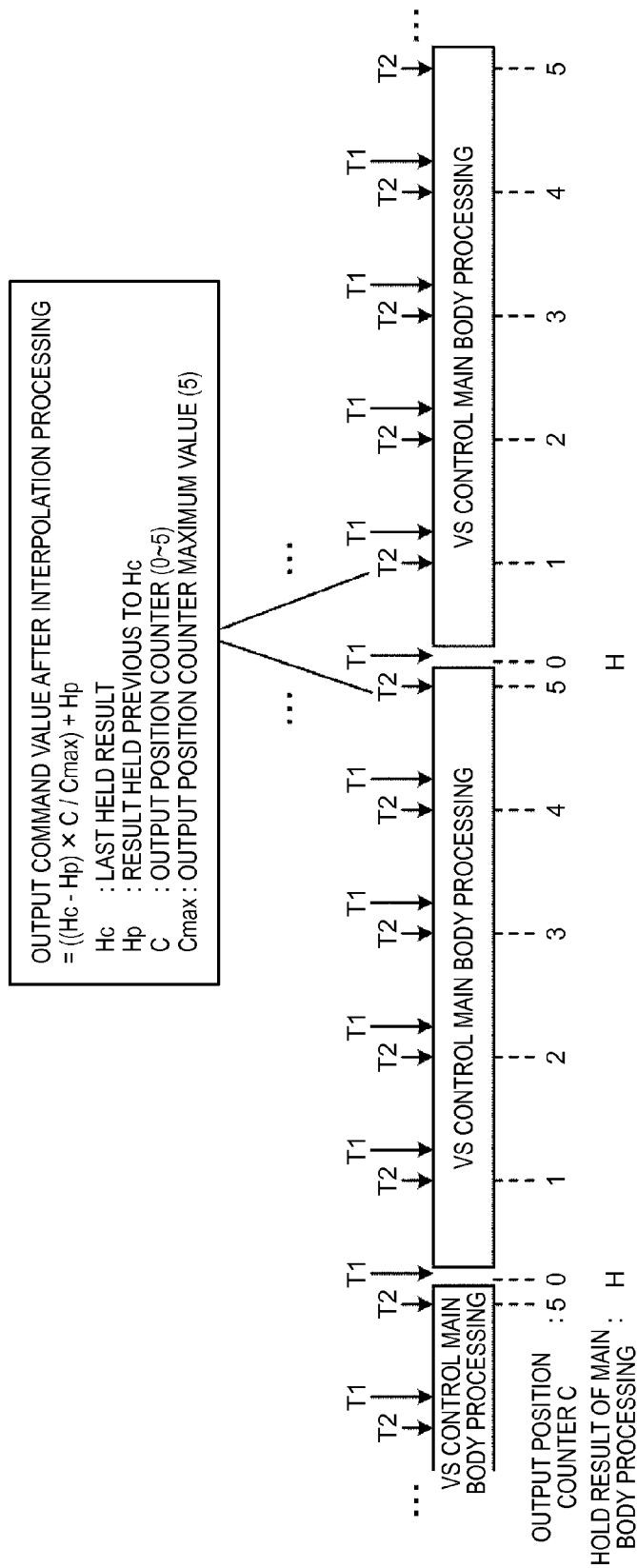
FIG. 13 is a diagram for explanation of an example of a method of determining command values of visual servoing control at respective times of generation of movement commands.

The interpolation processing performed by the visual servoing control unit 230 is explained. FIG. 13 is a diagram for explanation of an example of a method of determining the command values of visual servoing control at respective times of generation of movement commands.

The visual servoing control unit 230 adds one to an output position counter C when receiving the synchronization signal T2. Further, when the main body processing is ended, the output position counter C is reset (set to zero). In the example of FIG. 13, the output position counter C is counted at five times from the start to the end of main body processing, and the maximum value $C_{max}$ of the output position counter C is five.

Further, when the main body processing is ended, the visual servoing control unit 230 holds the movement command value calculated by the main body processing in a storage unit such as a memory (Hc) and further continuously holds the movement command value calculated by the previous main body processing (Hp) in the storage unit as described above.

In the output processing of the visual servoing control unit 230, at each time of reception of the synchronization signal T2, the output command value is determined based on the last movement command value Hc held at the time, the movement command value Hp previous to Hc, and the output position counter C using the following formula (1) and outputs the value to the main control unit 202.

$$\text{Output command value} = ((Hc - Hp) \times C/C_{max}) + Hp \quad (1)$$

If only the last held movement command value is output as the output command value at each time of reception of the synchronization signal T2, the same movement command value is continued to be output until the execution of the next main body processing is ended. Then, when the next main body processing is ended, the value of the output command value is abruptly changed to the movement command value of the next main body processing. Under the control, if the difference between the movement command values is larger, an abrupt movement of the end point may be caused.

Accordingly, with respect to each trigger of the synchronization signal T2, the visual servoing control unit 230 outputs the difference between the movement command value of the last ended main body processing and the movement command value of the previously ended main body processing at a ratio in response to the number of the synchronization signals T2 from the start of the main body processing being executed as described above. In this manner, the abrupt movement of the end point due to the movement command value of the visual servoing having the longer time of main body processing than the other controls may be suppressed.

Next, the operation of the robot controller 10 is explained. As described above, the respective controls (position control, impedance control, and visual servoing control) are individually started according to the preset start conditions and ended according to the preset end conditions. Further, the intervals of the synchronization signal T1 are 1 millisecond and the synchronization signal T2 is output after 800 microseconds from the synchronization signal T1.

Figure 14:
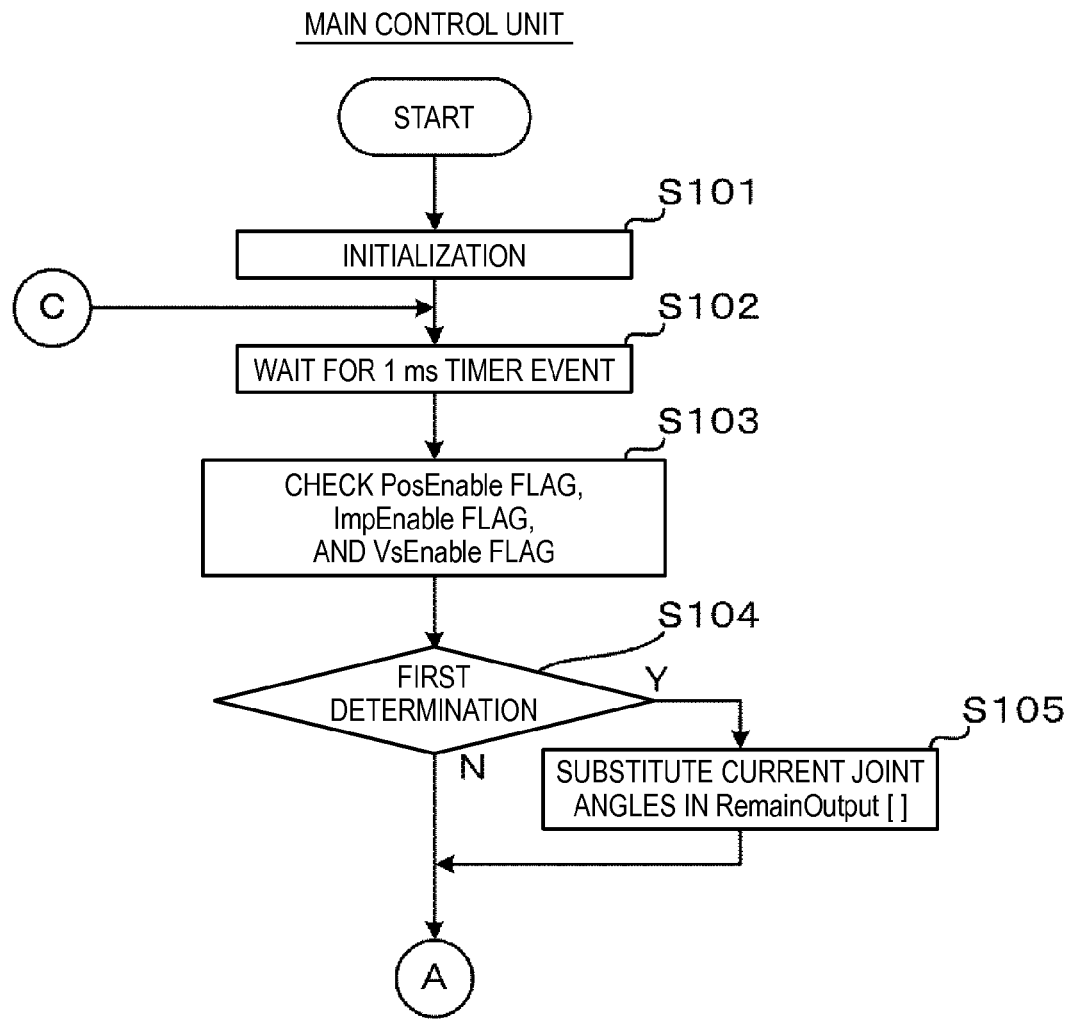
FIG. 14 is a flowchart showing an example of operation of a main control unit (Part 1).
Figure 15:
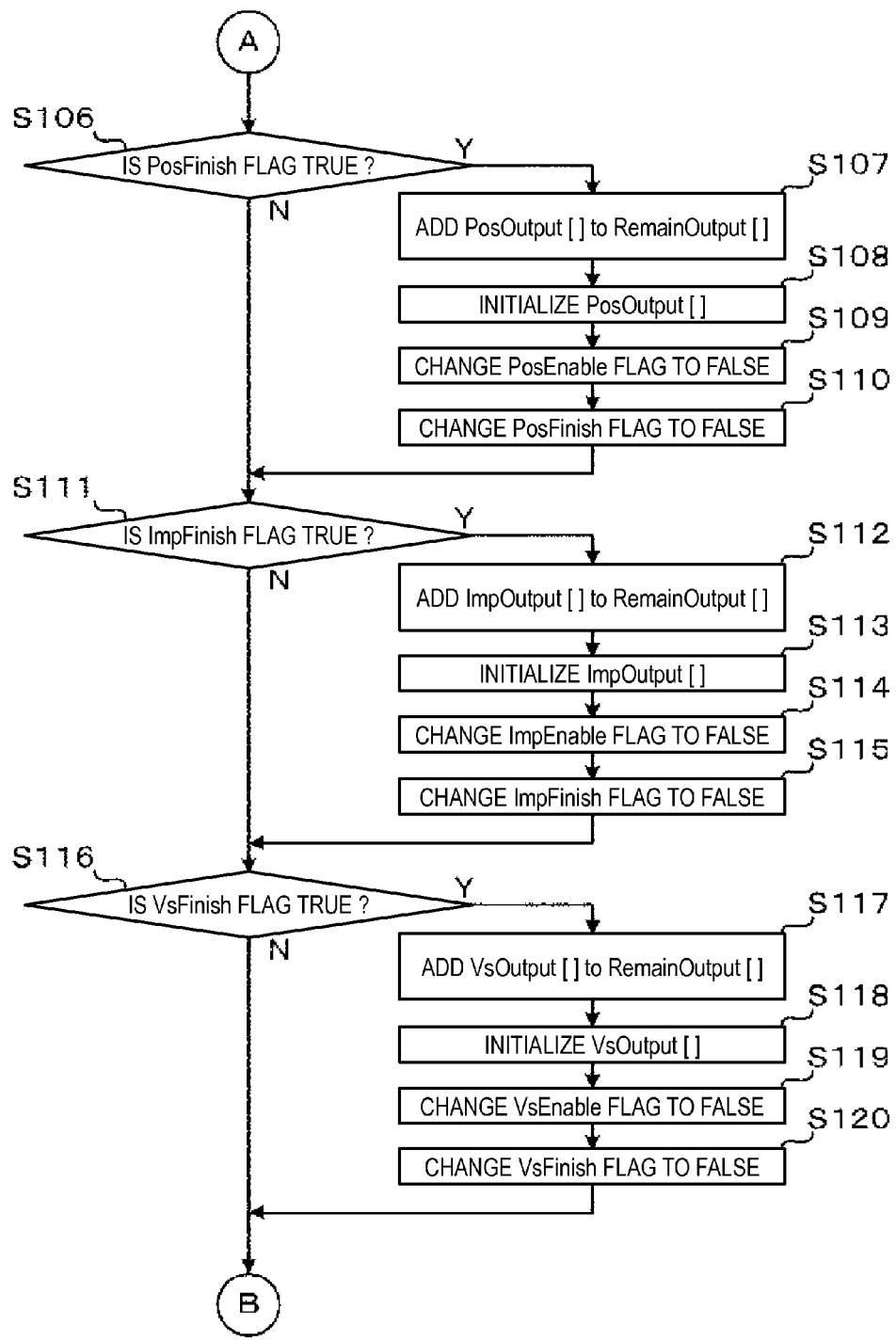
FIG. 15 is a flowchart showing the example of the operation of the main control unit (Part 2).
Figure 16:
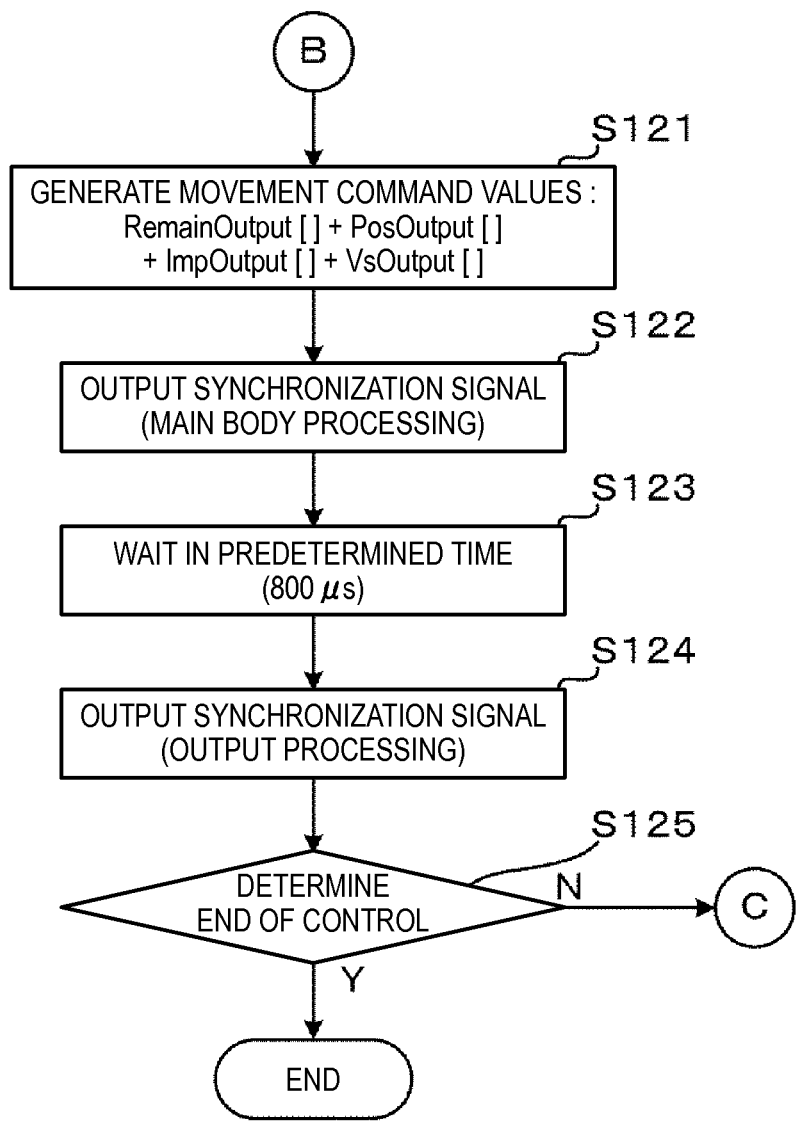
FIG. 16 is a flowchart showing the example of the operation of the main control unit (Part 3).

FIGS. 14, 15, and 16 are flowcharts showing an example of the operation of the main control unit (Part 1, Part 2, Part 3).

When the flow shown in FIGS. 14 to 16 is started, the main control unit 202 performs initialization processing (step S101). In the initialization processing, the main control unit 202 performs starting of various timers that determine output times of synchronization signals, setting of initial values for various variables, etc., for example.

Then, the main control unit 202 waits a timer event occurring due to timer interruption at each 1 millisecond, and proceeds the processing to step S103 if the timer event occurs (step S102).

Then, the main control unit 202 checks a PosEnable flag, an ImpEnable flag, and a VsEnable flag (step S103). The PosEnable flag, the ImpEnable flag, and the VsEnable flag are variables indicating that the position control, the impedance control, and the visual servoing control are enabled or disabled. The respective Enable flags are initially "false (disabled)" and set to "true (enabled)" when the respective controls are started (step S202 in FIG. 17, step S303 in FIG. 18, step S402 in FIG. 19).

Then, the main control unit 202 determines whether or not all of the respective Enable flags when the previous timer event occurs are "false" and one or more of the respective Enable flags when this timer event occurs are "true" (step S104). The main control unit 202 manages the values when the previous timer event occurs and the values when this timer event occurs with respect to the respective Enable flags using a storage unit such as the main storage device 92. At step S104, for example, the first determination as to whether or not to start the movement according to a series of operations of the robot is determined. Note that, when step S104 is first executed after the initialization at step S101, the first determination is made assuming that all of the respective Enable flags when the previous timer event occurs are "false".

If all of the respective Enable flags when the previous timer event occurs are "false" and one or more of the respective Enable flags when this timer event occurs are "true" (step S104: Y), the main control unit 202 acquires current angles of the respective joints (current position) from the drive control unit 200 of the robot 20, and substitutes them in RemainOutput[ ] (step S105). The RemainOutput[ ] is a variable indicating the reference position as a reference of control.

If the condition that all of the respective Enable flags when the previous timer event occurs are "false" and one or more of the respective Enable flags when this timer event occurs are "true" is not satisfied (step S104: N) or after step S105 is ended, the main control unit 202 determines whether or not a PosFinish flag is "true" (FIG. 15, step S106). The PosFinish flag is a variable indicating whether or not the position control has been ended. The PosFinish flag is initially "false" and set to "true" when the position control is ended.

If the PosFinish flag is "true" (step S106: Y), the main control unit 202 adds a value of a PosOutput[ ] to a value of a RemainOutput[ ] to update the value of the RemainOutput[ ] (step S107). The PosOutput[ ] is a variable indicating the output command value output by the position control (here, relative position indicating the difference from the reference position). Further, the main control unit 202 initializes the PosOutput[ ] (e.g., sets it to zero) (step S108). The main control unit 202 changes the PosEnable flag to "false" (step S109). Furthermore, the main control unit 202 changes the PosFinish flag to "false" (step S110).

If the PosFinish flag is not "true" (step S106: N) or after step S110 is ended, the main control unit 202 determines whether or not an ImpFinish flag is "true" (step S111). The ImpFinish flag is a variable that indicates whether or not the impedance control has been ended. The ImpFinish flag is initially "false" and set to "true" when the impedance control is ended.

If the ImpFinish flag is "true" (step S111: Y), the main control unit 202 adds a value of an ImpOutput[ ] to the value of the RemainOutput[ ] to update the RemainOutput[ ] (step S112). The ImpOutput[ ] is a variable indicating the output command value output by the impedance control (here, the relative position indicating the difference from the reference position). Further, the main control unit 202 initializes the ImpOutput[ ] (e.g., sets it to zero) (step S113). The main control unit 202 changes the ImpEnable flag to "false" (step S114). Furthermore, the main control unit 202 changes the ImpFinish flag to "false" (step S115).

If the ImpFinish flag is not "true" (step S111: N) or after step S115 is ended, the main control unit 202 determines whether or not a VsFinish flag is "true" (step S116). The VsFinish flag is a variable indicating whether or not the visual servoing control has been ended. The VsFinish flag is initially "false" and set to "true" when the visual servoing control is ended.

If the VsFinish flag is "true" (step S116: Y), the main control unit 202 adds a value of a VsOutput[ ] to the value of the RemainOutput[ ] to update the RemainOutput[ ] (step S117). The VsOutput[ ] is a variable indicating the output command value output by the visual servoing control (here, the relative position indicating the difference from the reference position). Further, the main control unit 202 initializes the VsOutput[ ] (e.g., sets it to zero) (step S118). The main control unit 202 changes the VsEnable flag to "false" (step S119). Furthermore, the main control unit 202 changes the VsFinish flag to "false" (step S120).

If the VsFinish flag is not "true" (step S116: N) or after step S120 is ended, the main control unit 202 generates a movement command value (FIG. 16, step S121). Specifically, the main control unit 202 adds the PosOutput[ ], the ImpOutput[ ], and the VsOutput[ ] as the relative positions to the RemainOutput[ ] as the reference position, and outputs a sum value as the movement command value to the robot 20. The processing at step S121 corresponds to the command generation processing in FIG. 12.

In the embodiment, the various variables of the RemainOutput[ ], the PosOutput[ ], the ImpOutput[ ], the VsOutput[ ], etc. are held in a storage unit such as the main storage device 92 for reference from the main control unit 202 and the respective control units (position control unit 210, impedance control unit 220, and visual servoing control unit 230).

Then, the main control unit 202 outputs the synchronization signal T1 that allows execution of the processing of calculating the movement command values (main body processing) to the respective control units (position control unit 210, impedance control unit 220, and visual servoing control unit 230) (step S122). Further, the main control unit 202 waits in 800 microseconds from output of the synchronization signal T1 using a timer or the like, and proceeds the processing to step S124 when the time elapses (step S123).

Then, the main control unit 202 outputs the synchronization signal T2 that allows execution of the processing of outputting the movement command values (output processing) to the respective control units (position control unit 210, impedance control unit 220, and visual servoing control unit 230) (step S124).

Then, the main control unit 202 determines whether or not to end the control (step S125). The main control unit 202 determines whether or not one or more of the respective Enable flags when the previous timer event occurs are "true" and all of the respective Enable flags at the time of step S125 are "false" and, if the condition is satisfied, determines to end the control. That is, the main control unit 202 determines whether or not the movement according to the series of operations of the robot has been ended. Obviously, the condition for ending the control is not limited to the above described condition.

If the control is not ended (step S125: N), the main control unit 202 returns the processing to step S102 (FIG. 14). On the other hand, if the control is ended (step S125: Y), the main control unit 202 ends the flow shown in FIGS. 14 to 16.

As described above, regarding the control with the Finish flag of "true" (step S106: Y, step S111: Y, step S116: Y), the main control unit 202 adds the output command value Output[ ] of the control to the reference position RemainOutput[ ] (steps S107, S112, S117), and initializes the output command value of the control (steps S108, S113, S118). In this manner, even when a control is ended, the reference position is updated by the final relative position output by the control, and thereby, the continuity of the movement command value calculated at step S121 may be kept without lack of the result of the movement command by the control.

Figure 17:
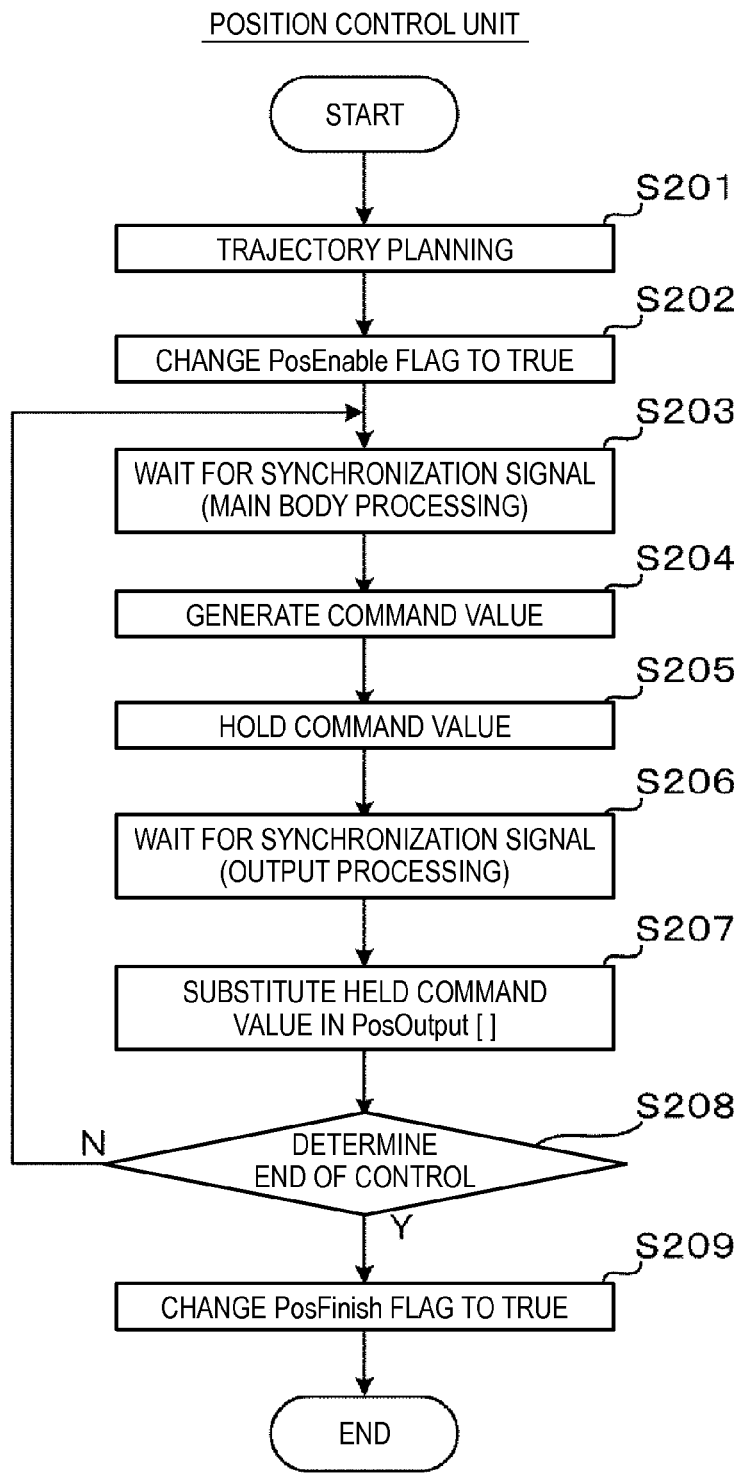
FIG. 17 is a flowchart showing an example of operation of a position control unit.

FIG. 17 is a flowchart showing an example of the operation of the position control unit. The flow shown in FIG. 17 is started when the preset start condition of the position control is satisfied, for example.

When the flow shown in FIG. 17 is started, the position control unit 210 performs trajectory planning (step S201). For example, the position control unit 210 obtains the positions of the end point at the respective times based on information on the route, and determines the target angles at the respective times. Further, the position control unit 210 changes the PosEnable flag to "true" (step S202).

Then, the position control unit 210 waits for the synchronization signal T1 from the main control unit 202 and proceeds the processing to step S204 when receiving the synchronization signal T1 (step S203).

Then, the position control unit 210 specifies the target angles to be output at this time based on the trajectory planned at step S201, generates the movement command value based on the target angles (step S204), and holds the value in a storage unit such as the main storage device 92 (step S205).

Then, the position control unit 210 waits for the synchronization signal T2 from the main control unit 202 and proceeds the processing to step S207 when receiving the synchronization signal T2 (step S206).

Then, the position control unit 210 acquires the movement command value held in the storage unit at step S205 and substitutes the value in the PosOutput[ ] (step S207). When the weight is set, the position control unit 210 multiplies the acquired movement command value by the weight, and substitutes the value in the PosOutput[ ]. The processing at step S207 corresponds to the output processing of the position control unit in FIG. 12.

Then, the position control unit 210 determines whether or not to end the position control (step S208). For example, the position control unit 210 determines whether or not the movement command value to the final target position on the route is output and, if the condition is satisfied, determines to end the position control. The end condition of the position control is not particularly limited, but may be the case where an error occurs, for example.

If the position control is not ended (step S208: N), the position control unit 210 returns the processing to step S203. On the other hand, if the position control is ended (step S208: Y), the position control unit 210 changes the PosFinish flag to "true" (step S209), and ends the flow shown in FIG. 17.

Figure 18:
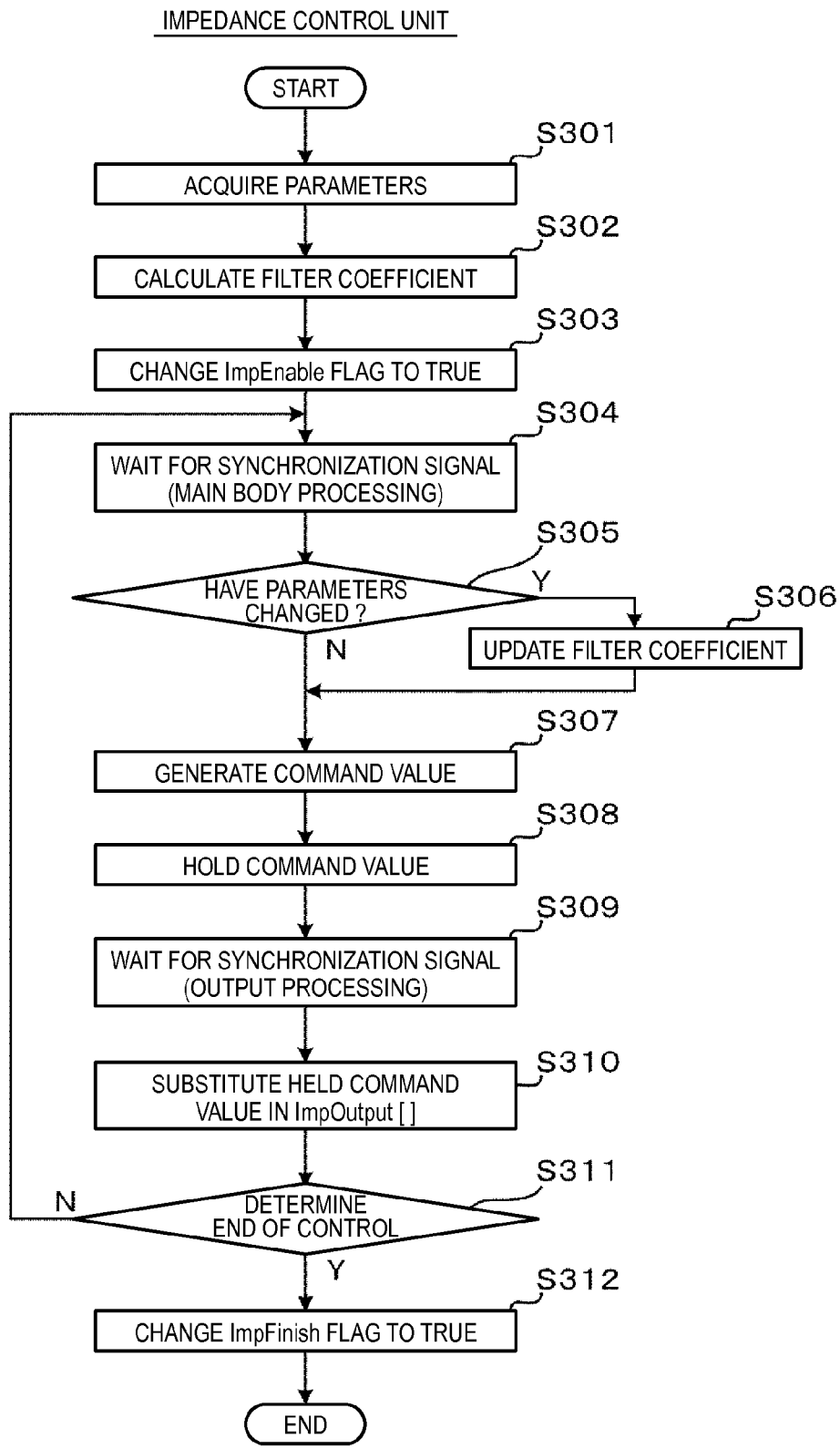
FIG. 18 is a flowchart showing an example of operation of an impedance control unit.

FIG. 18 is a flowchart showing an example of the operation of the impedance control unit. The flow shown in FIG. 18 is started when the start condition of the preset impedance control is satisfied, for example.

When the flow shown in FIG. 18 is started, the impedance control unit 220 acquires the parameters (e.g., the mass, the viscosity coefficient, and the elastic element set as the targets) (step S301), and calculates a filter coefficient used in filter processing of determining how the end point changes due to the parameters in response to the sensor information from the force sensor 25 (step S302). Further, the impedance control unit 220 changes the ImpEnable flag to "true" (step S303).

Then, the impedance control unit 220 waits for the synchronization signal T1 from the main control unit 202 and proceeds the processing to step S305 when receiving the synchronization signal T1 (step S304).

Then, the impedance control unit 220 determines whether or not the parameters (e.g., the mass, the viscosity coefficient, and the elastic element set as the targets) have changed (step S305). The changes of the parameters may be accepted from the user via the input device 95, for example. If the parameter is changed (step S305: Y), the impedance control unit 220 updates the filter coefficient used in filter processing (step S306). Through the processing at steps S305 and S306, the behavior of the impedance control may be changed at arbitrary times during execution of the impedance control, and thereby, the movement of the robot may be flexibly adjusted.

If the parameter is not changed (step S305: N) or after step S306 is ended, the impedance control unit 220 performs filter processing based on the sensor information from the force sensor 25, specifies the target angles to be output at this time, generates the movement command value based on the target angles (step S307), and holds the value in a storage unit such as the main storage device 92 (step S308).

Note that, in the impedance control, intermediate data representing the amount of movement and the direction of movement of the end point is calculated in response to the sensor information. Further, for conversion of the calculated amount of movement and the direction of movement (dX, dY,dZ) to the target angles (ImpOutput[ ]), for example, an inverse Jacobian matrix as expressed in the following formula (2) is used.

$$\begin{pmatrix} ImpOutput[1] \\ ImpOutput[2] \\ ImpOutput[3] \\ ImpOutput[4] \\ ImpOutput[5] \\ ImpOutput[6] \end{pmatrix} = \begin{bmatrix} \cdots \\ \cdots \\ \cdots \\ \cdots \\ \cdots \\ \cdots \end{bmatrix} \cdot \begin{pmatrix} dX \\ dY \\ dZ \end{pmatrix} \quad \text{Formula (2)}$$

Here, to obtain the elements of the inverse Jacobian matrix, without consideration of the amounts of movement and the directions of movement by the impedance control, movement command values (target angles) generated based on the movement command values output from the other controls (position control and visual servoing control) are necessary. In the embodiment, the reference position RemainOutput[ ] and the output command values of the other controls (position control and visual servoing control) are held in the storage unit, and thereby, the impedance control unit 220 may obtain and set the elements of the inverse Jacobian matrix with simple reference to the held values.

Then, the impedance control unit 220 waits for the synchronization signal T2 from the main control unit 202 and proceeds the processing to step S310 when receiving the synchronization signal T2 (step S309).

Then, the impedance control unit 220 acquires the movement command value held in the storage unit at step S308 and substitutes the value in the ImpOutput[ ] (step S310). When the weight is set, the impedance control unit 220 multiplies the acquired movement command value by the weight, and substitutes the value in the ImpOutput[ ]. The processing at step S310 corresponds to the output processing of the impedance control unit in FIG. 12.

Then, the impedance control unit 220 determines whether or not to end the impedance control (step S311). For example, the impedance control unit 220 determines whether or not the value of the sensor information exceeds a designated value and, if the condition is satisfied, determines to end the impedance control. The end condition of the impedance control is not particularly limited, but may be the case where an error occurs in the value of the sensor information, for example.

If the impedance control is not ended (step S311: N), the impedance control unit 220 returns the processing to step S304. On the other hand, if the impedance control is ended (step S311: Y), the impedance control unit 220 changes the ImpFinish flag to "true" (step S312), and ends the flow shown in FIG. 18.

Figure 19:
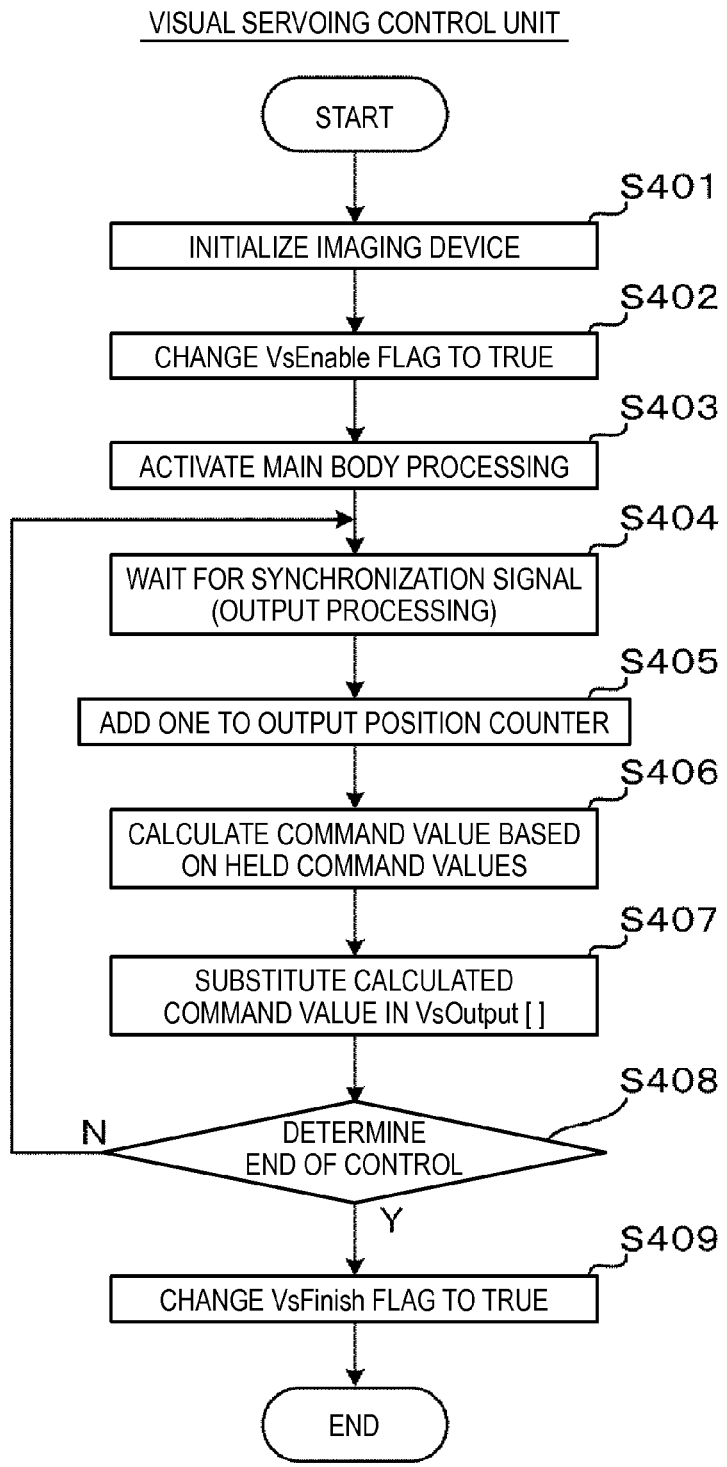
FIG. 19 is a flowchart showing an example of operation of a visual servoing control unit (Part 1).
Figure 20:
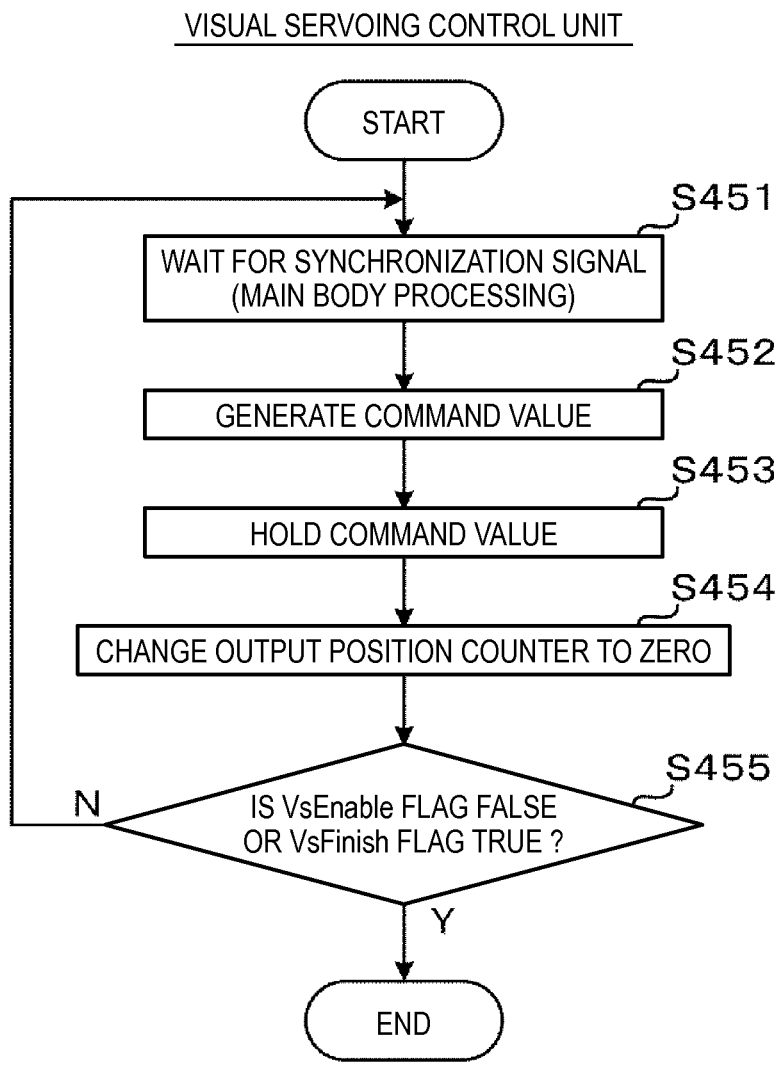
FIG. 20 is a flowchart showing the example of the operation of the visual servoing control unit (Part 2).

FIGS. 19 and 20 are flowcharts showing an example of the operation of the visual servoing control unit (Part 1, Part 2). The flow shown in FIG. 19 is started when the preset start condition of the visual servoing control is satisfied, for example. The flow shown in FIG. 19 and the flow shown in FIG. 20 are executed as separate tasks. Further, even when the processing at steps S451 to 455 in FIG. 20 is being executed, the processing at steps S404 to S409 in FIG. 19 is preferentially executed.

When the flow shown in FIG. 19 is started, the visual servoing control unit 230 performs initialization of the imaging device 30 (step S401). Further, the visual servoing control unit 230 changes the VsEnable flag to "true" (step S402). Then, the visual servoing control unit 230 activates the main body processing (FIG. 20) (step S403).

Then, the visual servoing control unit 230 waits for the synchronization signal T2 from the main control unit 202 and proceeds the processing to step S405 when receiving the synchronization signal T2 (step S404).

Then, the visual servoing control unit 230 adds one to the output position counter (step S405). Then, the visual servoing control unit 230 obtains an output command value based on the last movement command value and the movement command value immediately prior to the last movement command value held in the storage unit at step S453 (FIG. 20) and the output position counter updated at step S405 (step S406). The method of calculating the output command value is as described above using FIG. 13.

Then, the visual servoing control unit 230 acquires the output command value calculated at step S406 and substitutes the value in the VsOutput[ ] (step S407). When the weight is set, the visual servoing control unit 230 multiplies the acquired output command value by the weight, and substitutes the value in the VsOutput[ ]. The processing at steps S405 to S407 corresponds to the output processing of the visual servoing control unit in FIG. 12.

Then, the visual servoing control unit 230 determines whether or not to end the visual servoing control (step S408). For example, the visual servoing control unit 230 determines whether or not the current image coincides with the target image and, if the condition is satisfied, determines to end the visual servoing control. The end condition of the visual servoing control is not particularly limited, but may be the case where an error occurs, for example.

If the visual servoing control is not ended (step S408: N), the visual servoing control unit 230 returns the processing to step S404. On the other hand, if the visual servoing control is ended (step S408: Y), the visual servoing control unit 230 changes the VsFinish flag to "true" (step S409), and ends the flow shown in FIG. 19.

The flow shown in FIG. 20 is started when the main body processing is activated at step S403 (FIG. 19). First, the visual servoing control unit 230 waits for the synchronization signal T1 from the main control unit 202 and proceeds the processing to step S452 when receiving the synchronization signal T1 (step S451).

Then, the visual servoing control unit 230 specifies the target angles to be output at this time based on the current image and the target image acquired from the images acquired from the image acquisition unit 120, generates the movement command value based on the target angles (step S452), and holds the value in a storage unit such as the main storage device 92 (step S453).

As described above, the processing time of step S452 containing the image processing is longer. That is, the processing at the next step S451 is not executed until the processing at this step S452 is ended, and, even when the synchronization signal T1 is transmitted, the signal is ignored. Further, at step S453, the movement command value generated at this time and the movement command value at the previous time are held.

Then, the visual servoing control unit 230 changes the output position counter to zero (step S454).

Then, the visual servoing control unit 230 determines whether or not the VsEnable flag is "false" or whether or not the VsFinish flag is "true" (step S455). If the condition that the VsEnable flag is "false" or the VsFinish flag is "true" is not satisfied (step S455: N), the visual servoing control unit 230 returns the processing to step S451. On the other hand, if the VsEnable flag is "false" or the VsFinish flag is "true" (step S455: Y), the visual servoing control unit 230 ends the flow shown in FIG. 20.

As above, the embodiment has been explained. According to the embodiment, abrupt switching between controls may be prevented and overload and vibrations of the robot may be suppressed.

First Modified Example of Second Embodiment

In the embodiment, as shown in FIG. 12, the main body processing of the position control unit is executed with the synchronization signal T1 as the trigger. However, the main body processing of the position control unit 210 may be executed from the synchronization signal T2 to the immediately following synchronization signal T1. That is, the position control unit 210 executes the main body processing with the synchronization signal T2 as a trigger, and then, executes the output processing.

Figure 21:
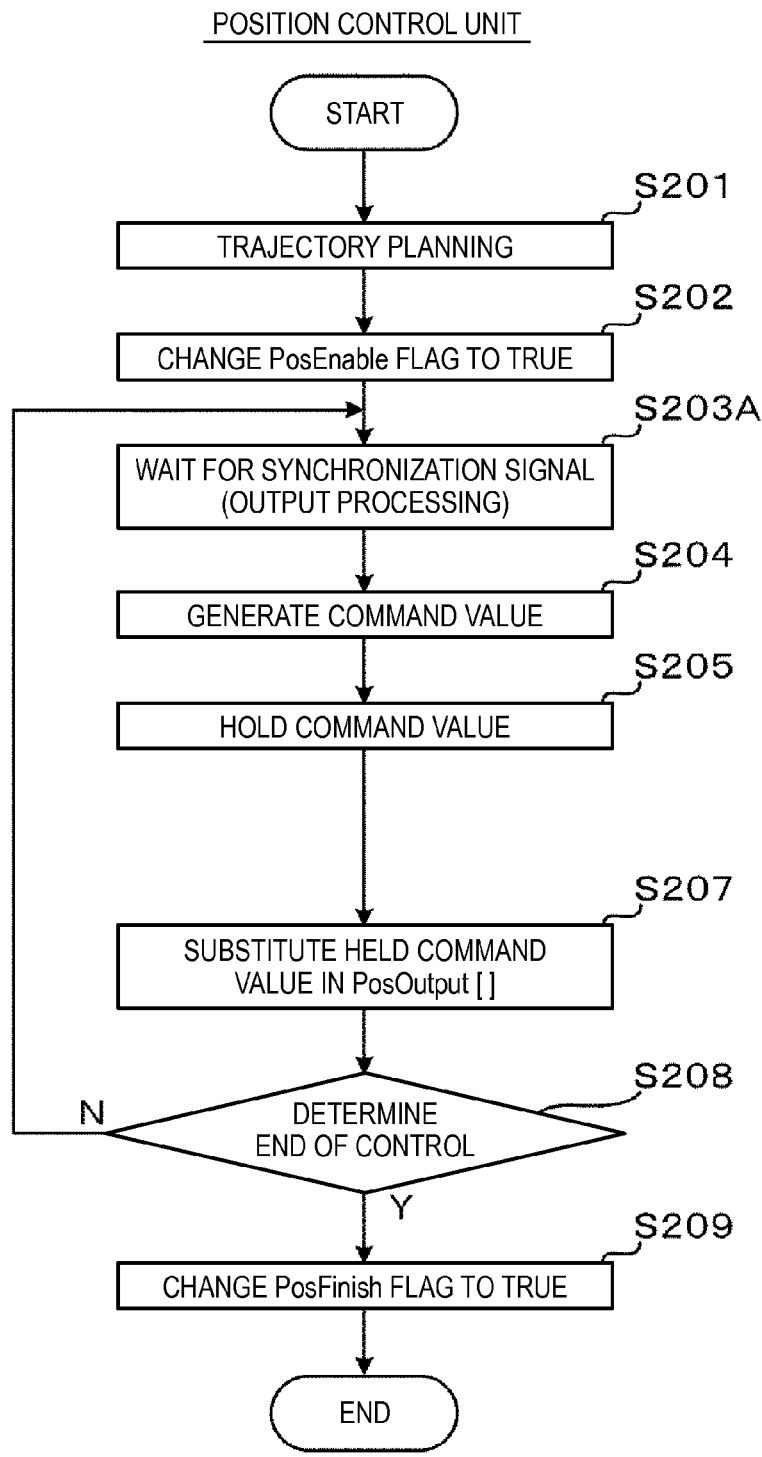
FIG. 21 is a flowchart showing an example of operation of a position control unit according to a first modified example of the second embodiment.

FIG. 21 is a flowchart showing an example of an operation of the position control unit according to the first modified example of the embodiment. In FIG. 21, the processing having the same signs as those in FIG. 17 have the same or similar functions as those of the processing in FIG. 17, and their detailed explanation will be omitted. The first modified example is different from the embodiment in that step S203A is executed in place of step S203 in FIG. 17 and step S206 in FIG. 17 is deleted.

When the flow in FIG. 21 is started, the position control unit 210 executes step S201, and then, executes step S202. Then, the position control unit 210 waits for the synchronization signal T2 from the main control unit 202 and proceeds the processing to step S204 when receiving the synchronization signal T2 (step S203A). Then, the position control unit 210 executes step S204, step S205, step S207. Then, the position control unit 210 determines whether or not to end the position control (step S208). If the position control is not ended (step S208: N), the position control unit 210 returns the processing to step S203A. On the other hand, if the position control is ended (step S208: Y), the position control unit 210 executes step S209, and ends the flow shown in FIG. 21.

As above, the first modified example of the embodiment has been explained. For example, when the main body processing of the position control is executed with the synchronization signal T2 as the trigger, the CPU resource assigned to the main body processing of the other controls including the visual servoing control may increase and the processing may be faster as the entire robot controller 10. The first modified example is effective in this case.

In the robot controller 10, the processing of position control may be switched to the processing in FIG. 17 or FIG. 21 in response to the user's command via the input device 95 and the processing load of the CPU, for example. Further, not only the main body processing of the position control but also the main body processing of the impedance control may be executed with the synchronization signal T2 as the trigger.

Third Embodiment

In the second embodiment, the respective controls (position control, impedance control, and visual servoing control) are individually started and ended at arbitrary times. However, depending on the operation contents of the robot, it may be better to simultaneously start the respective controls and simultaneously end the respective controls. In the embodiment, the respective controls are simultaneously started and simultaneously ended.

Figure 22:
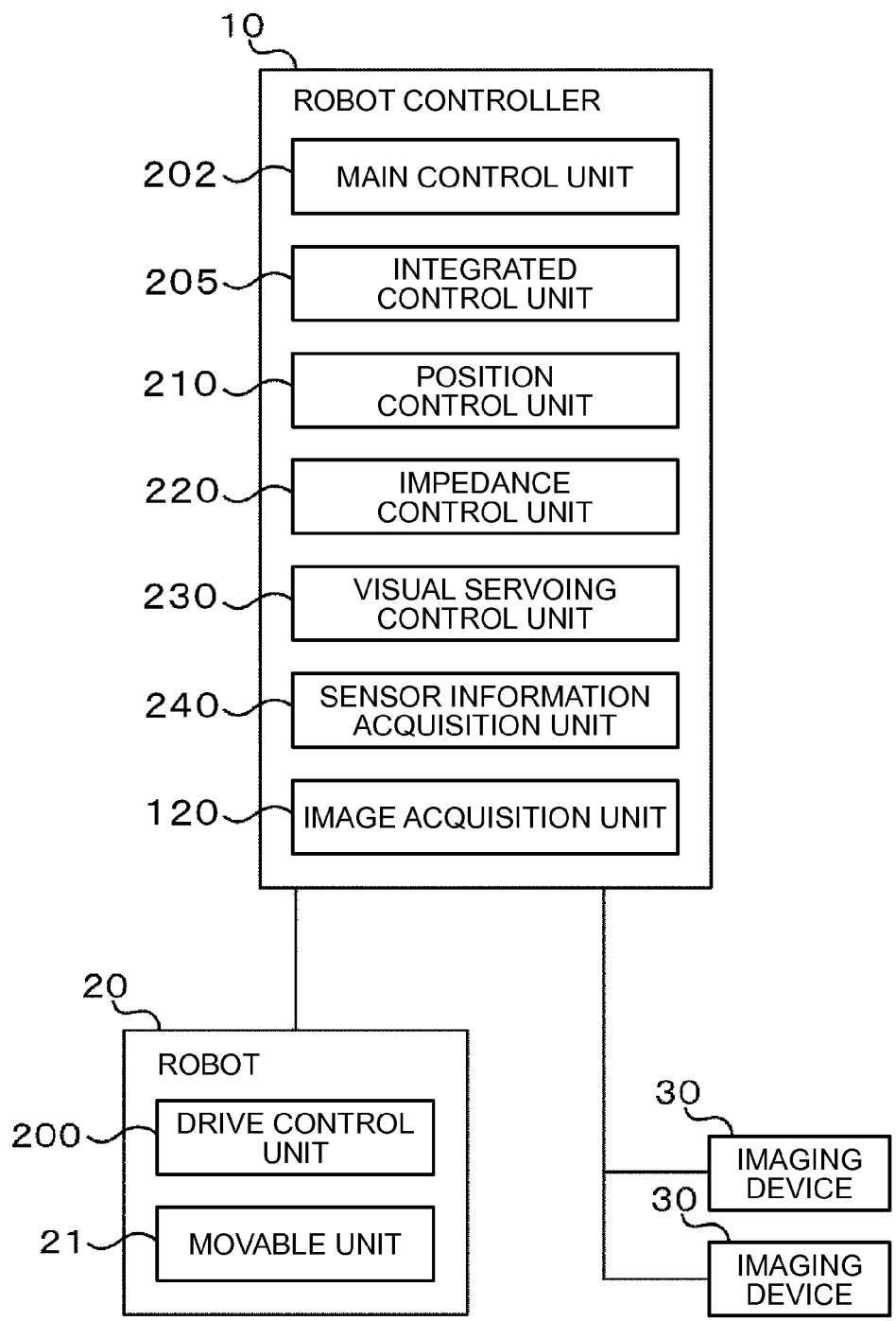
FIG. 22 shows an example of a function configuration of a robot system according to the third embodiment.

The processing of the main control unit 202 in FIGS. 14 to 16 is the same in the embodiment. On the other hand, the processing of the respective controls in FIGS. 17 to 20 is different from that of the second embodiment. In the embodiment, the respective partial processing of the position control unit, the impedance control unit, and the visual servoing control unit is executed in an integrated manner. Accordingly, an integrated control unit 205 that executes the partial processing of the respective control units in an integrated manner (see FIG. 22: an example of a function configuration of the robot system 1 according to the embodiment) is provided. The basic differences from the second embodiment are in the processing assignment and the processing sequence of the integrated control unit 205 and the respective control units, and the detailed explanation will be omitted.

Figure 23:
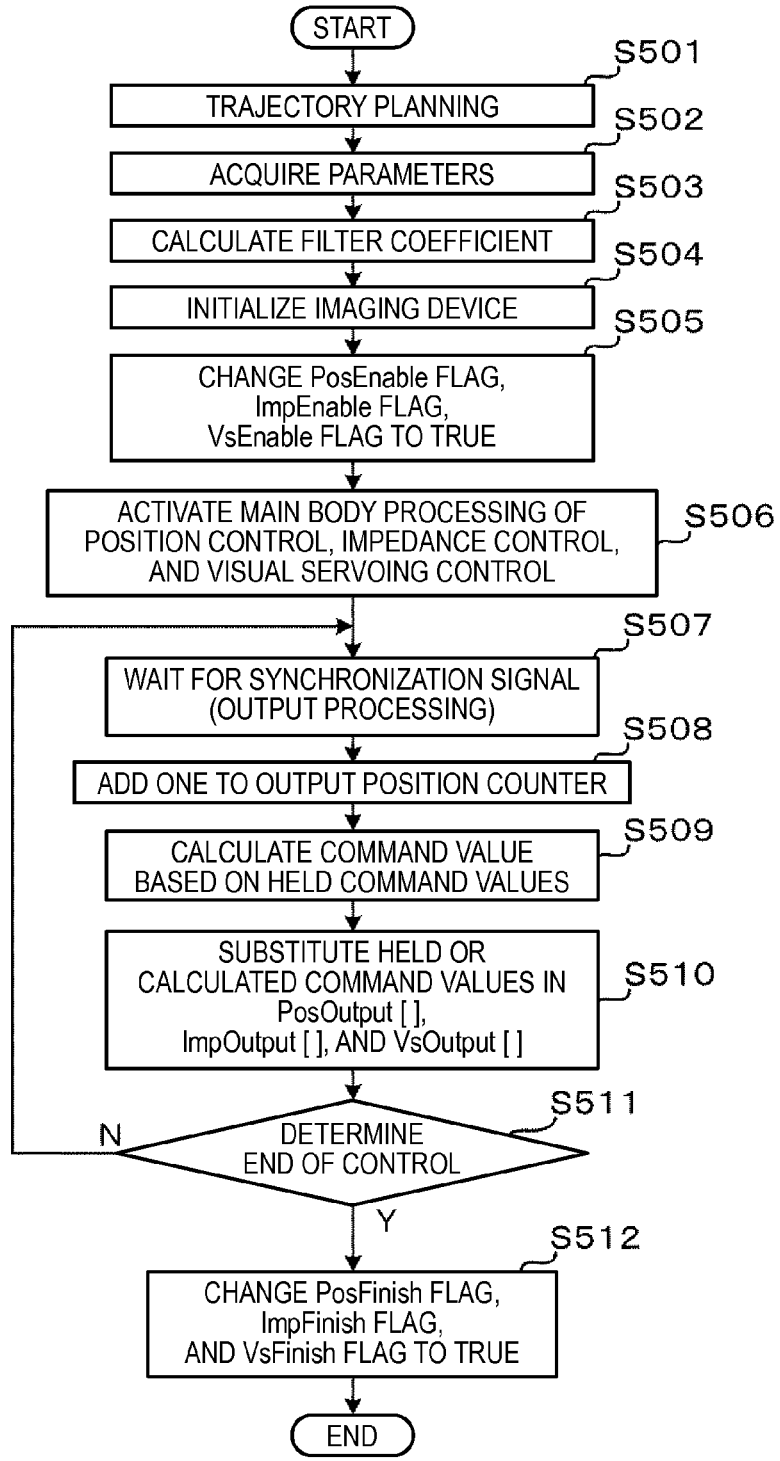
FIG. 23 is a flowchart showing an example of operation of an integrated control unit (position control, impedance control, and visual servoing control).

FIG. 23 is a flowchart showing an example of operation of the integrated control unit (position control, impedance control, and visual servoing control) in the embodiment.

When the flow shown in FIG. 23 is started, the integrated control unit 205 performs trajectory planning in position control (step S501). Then, the integrated control unit 205 acquires parameters in impedance control (step S502) and calculates a filter coefficient in the impedance control (step S503). Then, the integrated control unit 205 performs initialization of the imaging device 30 in visual servoing control (step S504).

Then, the integrated control unit 205 changes the PosEnable flag, the ImpEnable flag, and the VsEnable flag to "true" (step S505). Then, the integrated control unit 205 activates the main body processing of the position control (FIG. 24 to be described later), main body processing of the impedance control (FIG. 25 to be described later), and the main body processing of the visual servoing control (the same as that in FIG. 20 of the second embodiment) (step S506).

Then, the integrated control unit 205 waits for the synchronization signal T2 from the main control unit 202 and proceeds the processing to step S508 when receiving the synchronization signal T2 (step S507).

Then, the integrated control unit 205 adds one to the output position counter in the visual servoing control (step S508). Then, with respect to the visual servoing control, the integrated control unit 205 obtains an output command value of the visual servoing control based on the last movement command value and the movement command value immediately prior to the last movement command value held in the storage unit at step S453 (FIG. 20) and the output position counter updated at step S508 (step S509).

Then, with respect to the position control, the integrated control unit 205 acquires the movement command value held in the storage unit at step S603 (FIG. 24) and substitutes the value in the PosOutput[ ] (step S510). Further, with respect to the impedance control, the integrated control unit 205 acquires the movement command value held in the storage unit at step S703 (FIG. 25) and substitutes the value in the ImpOutput[ ] (step S510). Furthermore, with respect to the visual servoing control, the integrated control unit 205 acquires the output command value calculated at step S509 and substitutes the value in the VsOutput[ ] (step S510).

When the weights are set for the respective controls, the integrated control unit 205 multiplies the command values of the respective controls by the weights and substitutes the values in the respective Output[ ].

Then, the integrated control unit 205 determines whether or not to end all controls (position control, impedance control, and visual servoing control) (step S511). For example, with respect to the visual servoing control, the integrated control unit 205 determines whether or not the current image coincides with the target image and, if the condition is satisfied, determines to end all controls. The end condition of all controls is not particularly limited, but the end conditions of the respective controls may be combined, for example.

If all controls (position control, impedance control, and visual servoing control) are not ended (step S511: N), the integrated control unit 205 returns the processing to step S507. On the other hand, if all controls (position control, impedance control, and visual servoing control) are ended (step S511: Y), the integrated control unit 205 changes the PosFinish flag, the ImpFinish flag, and the VsFinish flag to "true" (step S512), and ends the flow shown in FIG. 23.

Figure 24:
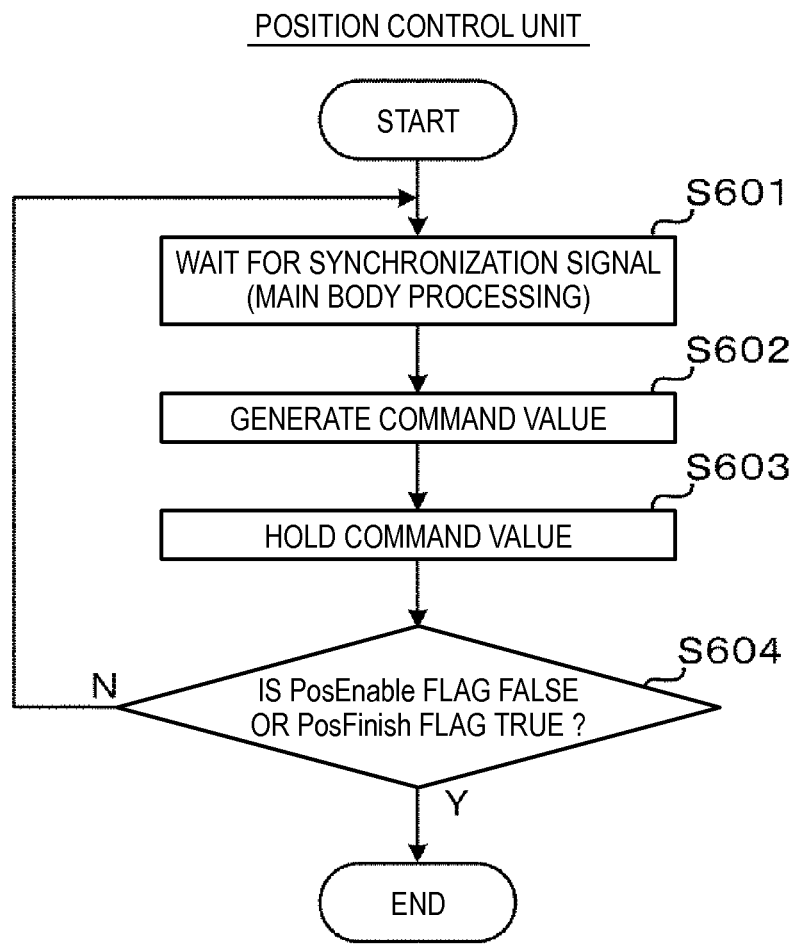
FIG. 24 is a flowchart showing an example of operation of a position control unit.

FIG. 24 is a flowchart showing an example of operation of the position control unit. The flow in FIG. 24 is started when the main body processing of the position control is activated at step S506 (FIG. 23).

First, the position control unit 210 waits for the synchronization signal T1 from the main control unit 202 and proceeds the processing to step S602 when receiving the synchronization signal T1 (step S601).

Then, the position control unit 210 specifies the target angles to be output at this time based on the trajectory planned at step S501 (FIG. 23), generates the movement command value based on the target angles (step S602), and holds the value in a storage unit such as the main storage device 92 (step S603).

Then, the position control unit 210 determines whether or not the PosEnable flag is "false" or the PosFinish flag is "true" (step S604). If the condition that the PosEnable flag is "false" or the PosFinish flag is "true" is not satisfied (step S604: N), the position control unit 210 returns the processing to step S601. On the other hand, if the PosEnable flag is "false" or the PosFinish flag is "true" (step S604: Y), the position control unit 210 ends the flow shown in FIG. 24.

Figure 25:
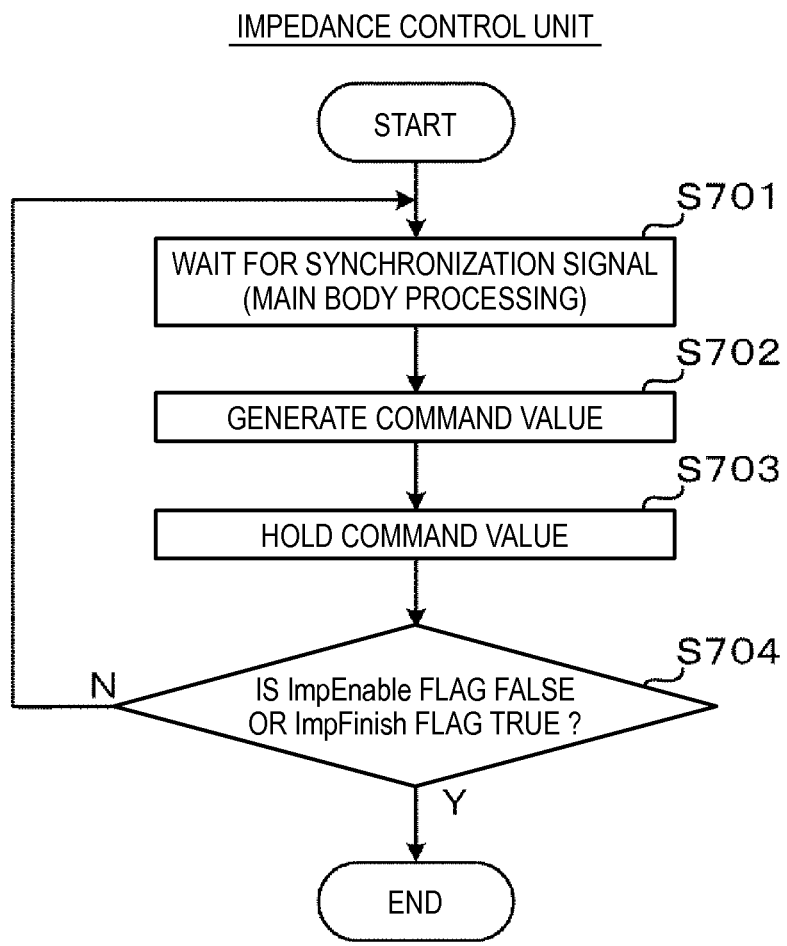
FIG. 25 is a flowchart showing an example of operation of an impedance control unit.

FIG. 25 is a flowchart showing an example of operation of the impedance control unit. The flow in FIG. 25 is started when the main body processing of the impedance control is activated at step S506 (FIG. 25).

First, the impedance control unit 220 waits for the synchronization signal T1 from the main control unit 202 and proceeds the processing to step S702 when receiving the synchronization signal T1 (step S701).

Then, the impedance control unit 220 performs filter processing based on the sensor information from the force sensor 25, specifies the target angles to be output at this time, generates the movement command value based on the target angles (step S702), and holds the value in a storage unit such as the main storage device 92 (step S703).

Then, the impedance control unit 220 determines whether or not the ImpEnable flag is "false" or the ImpFinish flag is "true" (step S704). If the condition that the ImpEnable flag is "false" or the ImpFinish flag is "true" is not satisfied (step S704: N), the impedance control unit 220 returns the processing to step S701. On the other hand, if the ImpEnable flag is "false" or the ImpFinish flag is "true" (step S704: Y), the impedance control unit 220 ends the flow shown in FIG. 25.

As above, the embodiment has been explained. According to the embodiment, the three controls (position control, impedance control, and visual servoing control) may be simultaneously started and simultaneously ended. When the robot is moved under the three controls, the start condition and the end condition are respectively the same, and the control is simpler.

First Modified Example of Third Embodiment

In the embodiment, the parallel operation of the three controls (position control, impedance control, and visual servoing control) is simultaneously started and simultaneously ended. However, depending on the operation contents of the robot, the two controls (position control and visual servoing control) may be simultaneously started and simultaneously ended.

In the first modified example of the embodiment, the operation of the integrated control unit 205 is different from that of the embodiment. Therefore, the difference will be explained with a focus thereon.

Figure 26:
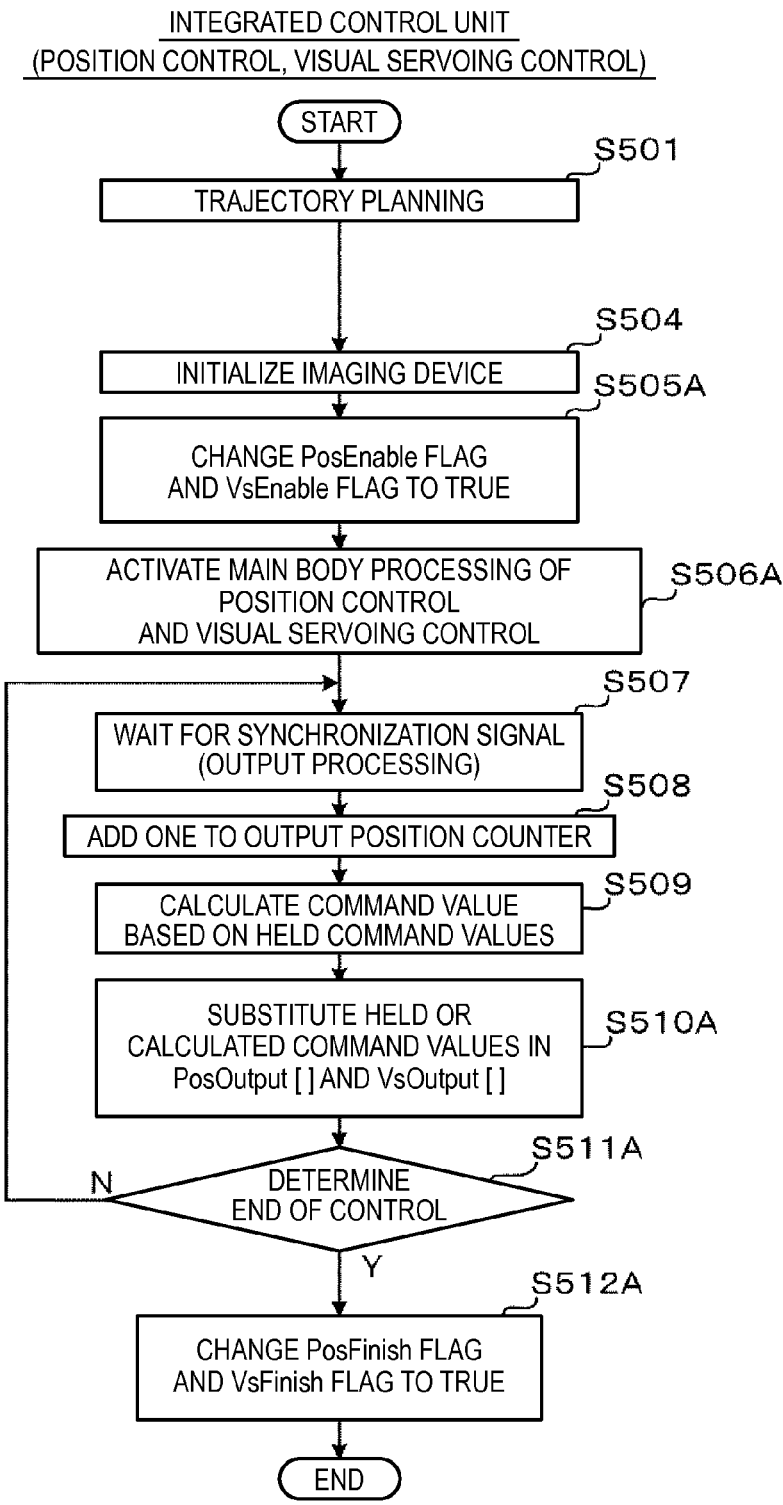
FIG. 26 is a flowchart showing an example of operation of an integrated control unit (position control and visual servoing control) according to a first modified example of the third embodiment.

FIG. 26 is a flowchart showing an example of operation of the integrated control unit (position control and visual servoing control) according to the first modified example of the third embodiment. In FIG. 26, the processing having the same signs as those in FIG. 23 have the same or similar functions as those of the processing in FIG. 23, and their detailed explanation will be omitted.

When the flow in FIG. 26 is started, the integrated control unit 205 performs trajectory planning in position control (step S501). Then, the integrated control unit 205 performs initialization of the imaging device 30 in visual servoing control (step S504). Then, the integrated control unit 205 changes the PosEnable flag and the VsEnable flag to "true" (step S505A). Then, the integrated control unit 205 activates the main body processing of the position control (FIG. 24) and the main body processing of the visual servoing control (FIG. 20) (step S506A).

Then, the integrated control unit 205 waits for the synchronization signal T2 from the main control unit 202 and proceeds the processing to step S508 when receiving the synchronization signal T2 (step S507). Then, the integrated control unit 205 adds one to the output position counter (step S508). Then, the integrated control unit 205 obtains the output command value of the visual servoing control. (step S509).

Then, with respect to the position control, the integrated control unit 205 acquires the movement command value held in the storage unit at step S603 (FIG. 24) and substitutes the value in the PosOutput[ ] (step S510A). Further, with respect to the visual servoing control, the integrated control unit 205 acquires the output command value calculated at step S509 and substitutes the value in the VsOutput[ ] (step S510A). When the weights are set for the respective controls, the integrated control unit 205 multiplies the command values of the respective controls by the weights and substitutes the values in the respective Output[ ].

Then, the integrated control unit 205 determines whether or not to end the position control and the visual servoing control (step S511A). For example, with respect to the visual servoing control, the integrated control unit 205 determines whether or not the current image coincides with the target image and, if the condition is satisfied, determines to end the respective controls. The end condition of the respective controls is not particularly limited, but the end conditions of the respective controls may be combined, for example.

If the position control and the visual servoing control are not ended (step S511A: N), the integrated control unit 205 returns the processing to step S507. On the other hand, if the position control and the visual servoing control are ended (step S511A: Y), the integrated control unit 205 changes the PosFinish flag and the VsFinish flag to "true" (step S512A), and ends the flow shown in FIG. 26.

As above, the first modified example of the embodiment has been explained. According to the first modified example of the embodiment, the two controls (position control and visual servoing control) may be simultaneously started and simultaneously ended. When the robot is moved under the two controls, the start condition and the end condition are respectively the same, and the control is simpler.

Second Modified Example of Third Embodiment

In the embodiment, the parallel operation of the three controls (position control, impedance control, and visual servoing control) is simultaneously started and simultaneously ended. However, depending on the operation contents of the robot, the two controls (impedance control and visual servoing control) may be simultaneously started and simultaneously ended.

In the second modified example of the embodiment, the operation of the integrated control unit 205 is different from that of the embodiment. Therefore, the difference will be explained with a focus thereon.

Figure 27:
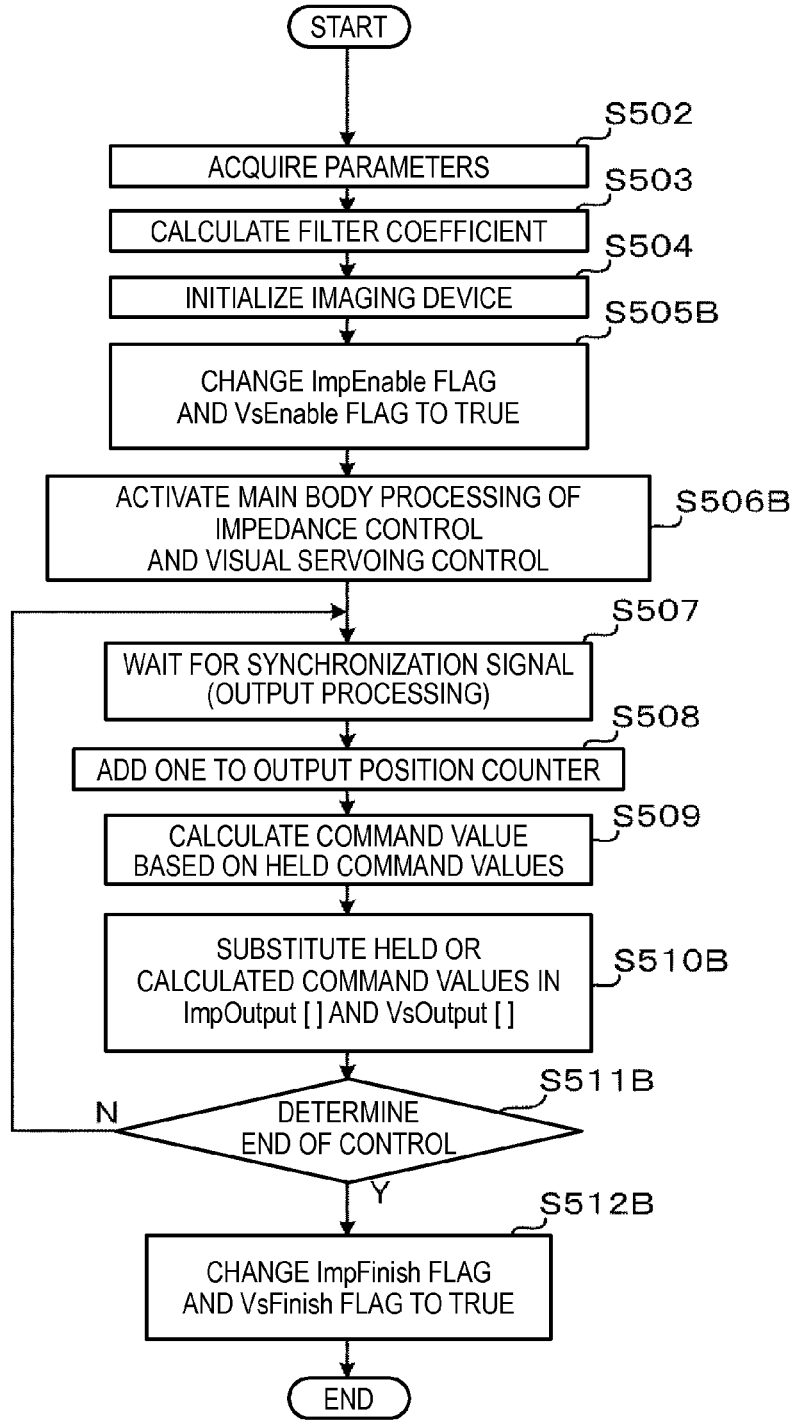
FIG. 27 is a flowchart showing an example of an operation of the integrated control unit (impedance control and visual servoing control) according to a second modified example of the third embodiment.

FIG. 27 is a flowchart showing an example of operation of the integrated control unit (impedance control and visual servoing control) according to the second modified example of the embodiment. In FIG. 27, the processing having the same signs as those in FIG. 23 have the same or similar functions as those of the processing in FIG. 23, and their detailed explanation will be omitted.

When the flow in FIG. 27 is started, the integrated control unit 205 acquires parameters in impedance control (step S502) and calculates a filter coefficient in the impedance control (step S503). Then, the integrated control unit 205 performs initialization of the imaging device 30 in visual servoing control (step S504).

Then, the integrated control unit 205 changes the ImpEnable flag and the VsEnable flag to "true" (step S505B). Then, the integrated control unit 205 activates the main body processing of the impedance control (FIG. 25) and the main body processing of the visual servoing control (FIG. 20) (step S506B).

Then, the integrated control unit 205 waits for the synchronization signal T2 from the main control unit 202 and proceeds the processing to step S508 when receiving the synchronization signal T2 (step S507). Then, the integrated control unit 205 adds one to the output position counter (step S508). Then, the integrated control unit 205 obtains the output command value of the visual servoing control. (step S509).

Then, with respect to the impedance control, the integrated control unit 205 acquires the movement command value held in the storage unit at step S703 (FIG. 25) and substitutes the value in the ImpOutput[ ] (step S510B). Further, with respect to the visual servoing control, the integrated control unit 205 acquires the output command value calculated at step S509 and substitutes the value in the VsOutput[ ] (step S510B). When the weights are set for the respective controls, the integrated control unit 205 multiplies the command values of the respective controls by the weights and substitutes the values in the respective Output[ ].

Then, the integrated control unit 205 determines whether or not to end the impedance control and the visual servoing control (step S511B). For example, with respect to the visual servoing control, the integrated control unit 205 determines whether or not the current image coincides with the target image and, if the condition is satisfied, determines to end the respective controls. The end condition of the respective controls is not particularly limited, but the end conditions of the respective controls may be combined, for example.

If the impedance control and the visual servoing control are not ended (step S511B: N), the integrated control unit 205 returns the processing to step S507. On the other hand, if the impedance control and the visual servoing control are ended (step S511B: Y), the integrated control unit 205 changes the ImpFinish flag and the VsFinish flag to "true" (step S512B), and ends the flow shown in FIG. 27.

As above, the second modified example of the embodiment has been explained. According to the second modified example of the embodiment, the two controls (impedance control and visual servoing control) may be simultaneously started and simultaneously ended. When the robot is moved under the two controls, the start condition and the end condition are respectively the same, and the control is simpler.

Third Modified Example of Third Embodiment

In the embodiment, the parallel operation of the three controls (position control, impedance control, and visual servoing control) is simultaneously started and simultaneously ended. However, depending on the operation contents of the robot, the two controls (position control and impedance control) may be simultaneously started and simultaneously ended.

In the third modified example of the embodiment, the operation of the integrated control unit 205 is different from that of the embodiment. Therefore, the difference will be explained with a focus thereon.

Figure 28:
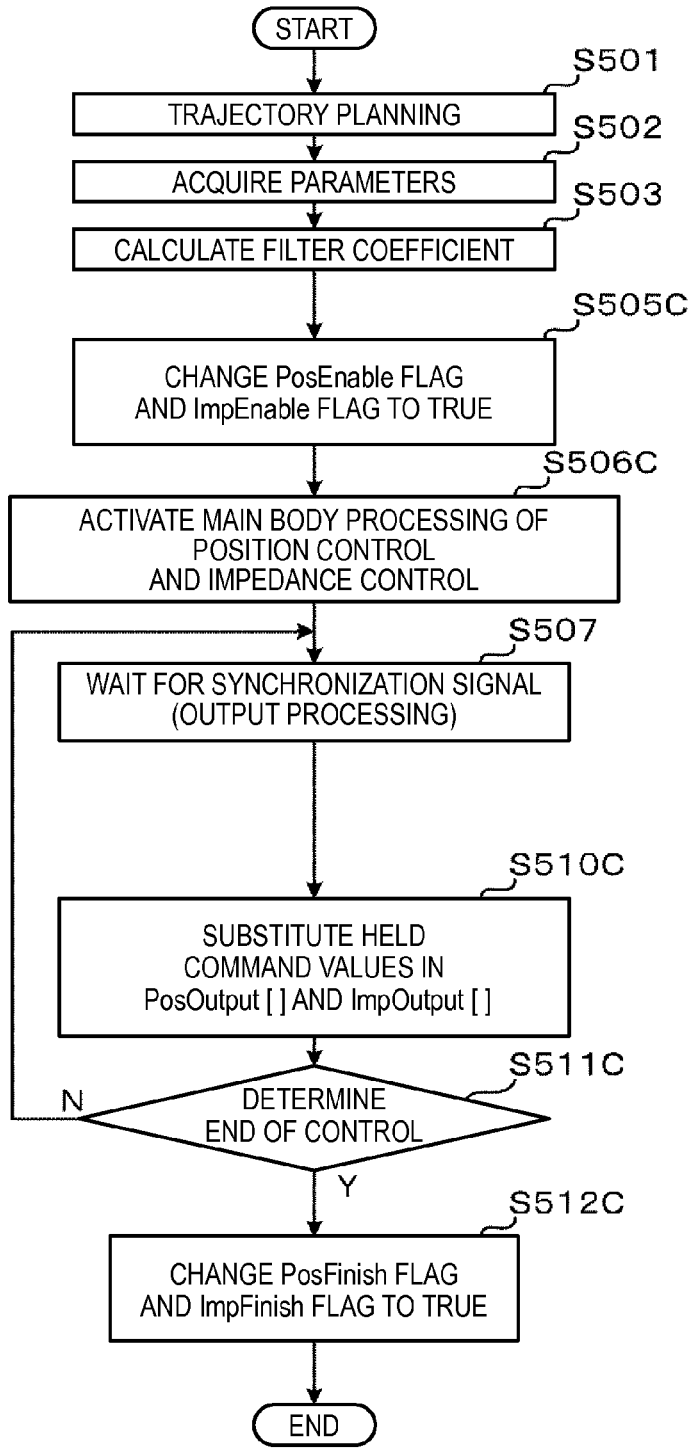
FIG. 28 is a flowchart showing an example of an operation of the integrated control unit (position control and impedance control) according to a third modified example of the third embodiment.

FIG. 28 is a flowchart showing an example of operation of the integrated control unit (position control and impedance control) according to the third modified example of the embodiment. In FIG. 28, the processing having the same signs as those in FIG. 23 have the same or similar functions as those of the processing in FIG. 23, and their detailed explanation will be omitted.

When the flow in FIG. 28 is started, the integrated control unit 205 performs trajectory planning in position control (step S501). Then, the integrated control unit 205 acquires parameters in impedance control (step S502) and calculates a filter coefficient in the impedance control (step S503).

Then, the integrated control unit 205 changes the PosEnable flag and the ImpEnable flag to "true" (step S505C). Then, the integrated control unit 205 activates the main body processing of the position control (FIG. 24) and the main body processing of the impedance control (FIG. 25) (step S506C).

Then, the integrated control unit 205 waits for the synchronization signal T2 from the main control unit 202 and proceeds the processing to step S510C when receiving the synchronization signal T2 (step S507).

Then, with respect to the position control, the integrated control unit 205 acquires the movement command value held in the storage unit at step S603 (FIG. 24) and substitutes the value in the PosOutput[ ] (step S510C). Further, with respect to the impedance control, the integrated control unit 205 acquires the movement command value held in the storage unit at step S703 (FIG. 25) and substitutes the value in the ImpOutput[ ] (step S510C). When the weights are set for the respective controls, the integrated control unit 205 multiplies the command values of the respective controls by the weights and substitutes the values in the respective Output[ ].

Then, the integrated control unit 205 determines whether or not to end the position control and the impedance control (step S511C). For example, with respect to the position control, the integrated control unit 205 determines whether or not the movement command value to the final target position on the route is output and, if the condition is satisfied, determines to end the respective controls. The end condition of the respective controls is not particularly limited, but the end conditions of the respective controls may be combined, for example.

If the position control and the impedance control are not ended (step S511C: N), the integrated control unit 205 returns the processing to step S507. On the other hand, if the position control and the impedance control are ended (step S511C: Y), the integrated control unit 205 changes the PosFinish flag and the ImpFinish flag to "true" (step S512C), and ends the flow shown in FIG. 28.

As above, the third modified example of the embodiment has been explained. According to the third modified example of the embodiment, the two controls (position control and impedance control) may be simultaneously started and simultaneously ended. When the robot is moved under the two controls, the start condition and the end condition are respectively the same, and the control is easier.

The above described respective units of processing in the respective flowcharts are divided according to the main processing contents for facilitation of understanding of the processing of the robot controller 10. The invention is not limited by the way of division and names of the units of processing. The processing of the robot controller 10 may be divided into more units of processing according to the processing contents. Further, one unit of processing may be divided to contain more processing.

The first aspect of the invention for solving the above described problems is a robot controller including a plurality of first control units that respectively output first command values for moving an end point of a movable unit of a robot, and a second control unit that controls the movable unit using a second command value obtained by summing the respective first command values output by the plurality of first control units. According to the first aspect, the robot may be controlled by the command value obtained by summing the command values of a plurality of controls, and thereby, abrupt switching between controls may be prevented and overload and vibrations of the robot may be suppressed.

The plurality of first control units may respectively execute main body processing of generating command values for moving the end point with a first synchronization time as a trigger and execute output processing of outputting the command values generated by the main body processing or command values calculated based on the command values as the first command values to the second control unit with a second synchronization time as a trigger, and the second control unit may generate the second command value by summing the first command values output by the output processing with the second synchronization time as the trigger. In this manner, even when the processing times and the end times of the main body processing of the respective controls are different, the first command values of the respective controls may be acquired at the synchronized time.

When the main body processing of the plurality of first control units respectively has different processing times and the main body processing is being executed when the output processing is executed, the output processing may be executed preferentially over the main body processing, and command values calculated based on command values generated by main body processing executed before the main body processing being executed may be output as the first command values. In this manner, if the main body processing has not been ended at the output processing, the first command values may be reliably output, and thereby, the robot may be controlled without lack of the first command values.

When the output processing is executed preferentially over the main body processing, the command values generated by the main body processing executed before the main body processing being executed may be calculated at a ratio in response to a number of the second synchronization times generated after start of the main body processing being executed and output as the first command values. In this manner, abrupt movement of the endpoint due to the first command values of the control having the longer main body processing time may be suppressed.

The first synchronization time may occur at first intervals, the second synchronization time may occur after a predetermined period shorter than the interval of the first synchronization time from the first synchronization time, and the processing time of single main body processing of the main body processing of the plurality of first control units may be longer than the first interval. In this manner, the first command values may be acquired at constant intervals for control of the robot.

The plurality of first control units may perform position control of generating the first command values for moving the end point according to a preset route and visual servoing control of generating the first command values for moving the end point from a current position to a target position based on a target image as an image containing the end point when the end point is in the target position and a current image as an image containing the end point when the end point is in the current position, and the processing time of the main body processing of the position control may be shorter than the first interval and the processing time of the main body processing of the visual servoing control may be longer than the first interval. In this manner, the position control and the visual servoing control may be operated in parallel.

The plurality of first control units may perform visual servoing control of generating the first command values for moving the end point from a current position to a target position based on a target image as an image containing the end point when the end point is in the target position and a current image as an image containing the end point when the end point is in the current position and impedance control of generating the first command values for moving the end point based on output from a force detection unit that detects a force acting on the movable unit, and the main body processing of the impedance control may be shorter than the first interval and the main body processing of the visual servoing control may be longer than the first interval. In this manner, the impedance control and the visual servoing control may be operated in parallel.

The controller may have a storage unit that holds the first command values output by the plurality of first control units, and the impedance control may acquire the first command values output by the other control from the storage unit and set elements of an inverse Jacobian matrix using the acquired first command values. In this manner, the first command values of the other control necessary for the impedance control may be easily acquired.

The respective processing of the plurality of first control units may be started when start conditions preset for the respective processing are satisfied and ended when end conditions preset for the respective processing are satisfied, and, when the processing by the plurality of first control units is being executed, if the processing of part of the first control units of the plurality of first control units is ended, the second control unit may generate the second command value using the last first command values output from the ended first control units and the first command values output from the not-ended first control units. In this manner, the continuity of the second command value may be held without lack of results of the first command values by the ended control.

The processing of the plurality of first control units may be simultaneously started when a preset start condition is satisfied and simultaneously ended when a preset end condition is satisfied. In this manner, the processing of the plurality of first control units may be started and ended according to single start condition and end condition, and thereby, parallel operation of the plurality of controls may be easily controlled.

The plurality of first control units may weight the first command values with predetermined weights set for the respective units and output the values. In this manner, flexible control may be performed for suppressing overload of motors and vibrations of the robot in response to the operation contents of the robot.

The second aspect of the invention for solving the above described problems is a robot including a movable unit, a plurality of first control units that respectively output first command values for moving an end point of the movable unit, and a second control unit that controls the movable unit using a second command value obtained by summing the respective first command values output by the plurality of first control units. According to the second aspect, the robot may be controlled by the command value obtained by summing the command values of the plurality of controls, and thereby, abrupt switching between controls may be prevented and overload and vibrations of the robot may be suppressed.

The third aspect of the invention for solving the above described problems is a robot system including a robot having a movable unit, a plurality of first control units that respectively output first command values for moving an end point of the movable unit, and a second control unit that controls the movable unit using a second command value obtained by summing the respective first command values output by the plurality of first control units. According to the third aspect, the robot may be controlled by the command value obtained by summing the command values of the plurality of controls, and thereby, abrupt switching between controls may be prevented and overload and vibrations of the robot may be suppressed.

The fourth aspect of the invention for solving the above described problems is a robot control method including a plurality of first control steps of respectively outputting first command values for moving an end point of a movable unit of a robot, and a second control step of controlling the movable unit using a second command value obtained by summing the respective first command values output by the plurality of first control units. According to the fourth aspect, the robot may be controlled by the command value obtained by summing the command values of the plurality of controls, and thereby, abrupt switching between controls may be prevented and overload and vibrations of the robot may be suppressed.

The fifth aspect of the invention for solving the above described problems is a program for a robot controller, allowing the robot controller to function as a plurality of first control units that respectively output first command values for moving an end point of a movable unit of a robot, and a second control unit that controls the movable unit using a second command value obtained by summing the respective first command values output by the plurality of first control units. According to the fifth aspect, the robot may be controlled by the command value obtained by summing the command values of the plurality of controls, and thereby, abrupt switching between controls may be prevented and overload and vibrations of the robot may be suppressed.

The sixth aspect of the invention for solving the above described problems is a robot controller moving a robot to a first position based on at least one of information on a predetermined movement route of the robot and information from a force detection unit as well as information acquired from an imaging unit at a first time point, and moving the robot to a second position based on at least one of the information on the movement route and the information from the force detection unit as well as information acquired from the imaging unit after the first time point. Thereby, at least two different controls are operated in parallel, and thereby, abrupt switching between controls may be prevented and overload and vibrations of the robot may be suppressed.

The seventh aspect of the invention for solving the above described problems is a robot moving the robot to a first position based on at least one of information on a predetermined movement route of the robot and information from a force detection unit as well as information acquired from an imaging unit at a first time point, and moving the robot to a second position based on at least one of the information on the movement route and the information from the force detection unit as well as information acquired from the imaging unit after the first time point. Thereby, at least two different controls are operated in parallel, and thereby, abrupt switching between controls may be prevented and overload and vibrations of the robot may be suppressed.

The eighth aspect of the invention for solving the above described problems is a robot system having a robot and a robot controller, the robot controller moves a robot to a first position based on at least one of information on a predetermined movement route of the robot and information from a force detection unit as well as information acquired from an imaging unit at a first time point, and moves the robot to a second position based on at least one of the information on the movement route and the information from the force detection unit as well as information acquired from the imaging unit after the first time point. Thereby, at least two different controls are operated in parallel, and thereby, abrupt switching between controls may be prevented and overload and vibrations of the robot may be suppressed.

As above, the explanation has been made using the embodiments, however, the technical scope of the invention is not limited to the scope described in the embodiments. It is obvious to a person who skilled in the art that various changes or improvements may be made to the embodiments. Further, it is clear from the description of the appended claims that the embodiments to which those changes or improvements are made may fall within the technical scope of the invention. The invention may be provided as a robot system separately having a robot and a controller or the like, may be provided as a robot containing a robot controller or the like, or may be provided as a controller. Further, the invention may be provided as a method of controlling a robot or the like, a program for controlling a robot or the like, or a storage medium in which the program is stored.

What is claimed is:

1. A robot controller comprising:
an image acquisition unit that acquires a target image containing an end point of a movable unit of a robot when the end point is in a target position, and a current image containing the end point when the end point is in a current position;
a first control unit that generates a first command value for moving the end point from the current position to the target position based on the current image and the target image;
a second control unit that generates a second command value for moving the end point based on output from a force detection unit that detects a force acting on the movable unit; and
a third control unit that moves the movable unit using the first command value generated by the first control unit and the second command value generated by the second control unit, wherein
the third control unit moves the movable unit using a third command value obtained by summing the first and second command values with respective predetermined weights, and
the force detection unit detects the force acting on the movable unit by impedance control, and the impedance control is performed by detecting a mass, a viscosity coefficient and an elastic coefficient when an external force is applied to an object held by the movable unit.

2. A robot controller comprising:
a control unit that controls a movable unit of a robot to move an end point of the movable unit closer to a target position; and
an image acquisition unit that acquires a target image containing the end point when the end point is in the target position, and a current image containing the end point when the end point is in a current position,
wherein the control unit controls movement of the movable unit based on the current image and the target image and output from a force detection unit that detects a force acting on the movable unit, and
the force detection unit detects the force acting on the movable unit by impedance control, and the impedance control is performed by detecting a mass, a viscosity coefficient and an elastic coefficient when an external force is applied to an object held by the movable unit.

3. The robot controller according to claim 1, further comprising an input unit that accepts setting of the predetermined weights from a user.

4. The robot controller according to claim 1, wherein the third control unit determines the predetermined weights based on a distance between the current position and the target position.

5. The robot controller according to claim 4, wherein the third control unit determines the distance based on the target and current images acquired by the image acquisition unit.

6. The robot controller according to claim 4, wherein the third control unit sets one of the predetermined weights corresponding to the second command value generated by the second control unit to be larger as the distance is smaller.

7. The robot controller according to claim 4, wherein the third control unit sets one of the predetermine weights corresponding to the second command value generated by the second control unit to be zero when the distance is larger than a predetermined value.

8. A robot comprising:
the robot controller of claim 1;
the movable unit of claim 1; and
the force detection unit of claim 1.

9. A robot comprising:
the robot controller of claim 2;
the movable unit of claim 2; and
the force detection unit of claim 2.

10. A robot system comprising:
the robot controller of claim 1; and
a robot having the movable unit of claim 1.

11. A robot system comprising:
the robot controller of claim 2; and
a robot having the movable unit of claim 2.

12. A robot control method comprising:
an image acquisition step of acquiring a target image containing an end point of a movable unit of a robot when the end point is in a target position, and a current image containing the end point when the end point is in a current position;
a first control step of generating a first command value for moving the end point from the current position to the target position based on the current image and the target image;
a second control step of generating a second command value for moving the end point based on output from a force detection unit that detects a force acting on the movable unit; and
a third control step of moving the movable unit using the first command value generated at the first control step and the second command value generated at the second control step, wherein
in the third control step, the movable unit moves by using a third command value obtained by summing the first and second command values with respective predetermined weights, and
the force detection unit detects the force acting on the movable unit by impedance control, and the impedance control is performed by detecting a mass, a viscosity coefficient and an elastic coefficient when an external force is applied to an object held by the movable unit.

13. A robot control method comprising:
a control step of controlling a movable unit of a robot to move an end point of the movable unit closer to a target position; and
an image acquisition step of acquiring a target image containing the end point when the end point is in the target position, and a current image containing the end point when the end point is in a current position,
wherein in the control step, movement of the movable unit is controlled based on the current image and the target image and output from a force detection unit that detects a force acting on the movable unit, and
the force detection unit detects the force acting on the movable unit by impedance control, and the impedance control is performed by detecting a mass, a viscosity coefficient and an elastic coefficient when an external force is applied to an object held by the movable unit.

* * * * *